(12) United States Patent
Campbell et al.

(10) Patent No.: US 7,106,850 B2
(45) Date of Patent: Sep. 12, 2006

(54) CUSTOMER COMMUNICATION SERVICE SYSTEM

(75) Inventors: Alasdhair Campbell, Austin, TX (US); Stephen A. Michael, Colorado Springs, CO (US)

(73) Assignee: Aastra Intecom Inc., Frisco, TX (US)

( * ) Notice: Subject to any disclaimer, the term of this patent is extended or adjusted under 35 U.S.C. 154(b) by 677 days.

(21) Appl. No.: 09/756,471

(22) Filed: Jan. 8, 2001

(65) Prior Publication Data

US 2001/0024497 A1 Sep. 27, 2001

Related U.S. Application Data

(60) Provisional application No. 60/174,961, filed on Jan. 7, 2000.

(51) Int. Cl.
  *H04M 3/42* (2006.01)
  *H04L 12/66* (2006.01)
(52) U.S. Cl. .................. 379/265.09; 455/438; 370/352
(58) Field of Classification Search ............... 370/352, 370/353, 354, 355, 356; 379/265, 309, 93.12, 379/266; 709/203, 219, 248
See application file for complete search history.

(56) References Cited

U.S. PATENT DOCUMENTS

| | | |
|---|---|---|
| 4,956,852 A | 9/1990 | Hodge |
| 4,979,118 A | 12/1990 | Kheradpir |
| 5,206,903 A | 4/1993 | Kohler et al. |
| 5,444,774 A | 8/1995 | Friedes |
| 5,479,487 A | 12/1995 | Hammond |
| 5,524,147 A | 6/1996 | Bean |
| 5,546,447 A | 8/1996 | Skarbo et al. |
| 5,570,410 A | 10/1996 | Hooshiari |
| 5,592,542 A | 1/1997 | Honda et al. |
| 5,646,986 A | 7/1997 | Sahni et al. |
| 5,657,461 A | 8/1997 | Harkins et al. |
| 5,715,306 A | 2/1998 | Sunderman et al. |
| 5,740,238 A | 4/1998 | Flockhart et al. |
| 5,809,423 A | 9/1998 | Benveniste |
| 5,825,869 A | 10/1998 | Brooks et al. |
| 5,825,870 A | 10/1998 | Miloslavsky |
| 5,828,747 A | 10/1998 | Fisher et al. |
| 5,857,018 A | 1/1999 | Sumner et al. |
| 5,884,032 A | 3/1999 | Bateman et al. |
| 5,903,641 A | 5/1999 | Tonisson |
| 5,903,877 A | 5/1999 | Berkowitz et al. |
| 5,905,793 A | 5/1999 | Flockhart et al. |
| 5,933,492 A | 8/1999 | Turovski |
| 5,940,487 A | 8/1999 | Bunch et al. |
| 5,940,496 A | 8/1999 | Gisby et al. |
| 5,940,497 A | 8/1999 | Miloslavsky |

(Continued)

FOREIGN PATENT DOCUMENTS

EP 0 954 155 A2 11/1999

*Primary Examiner*—Gerald Gauthier

(57) ABSTRACT

A system and method is disclosed for servicing multi media customer communications to geographically distributed agents from multiple call center sites via the telephone network and a global data communications network. The system provides separate interface ports to the telephone network and a global data communications network, eliminating a potential choke point for limiting communications performance. Multi media workflow provides common elements for handling diverse media event types. The system a novel algorithm for skill based matching the attributes of multiple media events to the attributes of multiple call center agents. Universal queuing is provided to enable effective use of skill based matching features. A unique method for allocating voice trunk lines provides greater efficiency of available voice communication channels and maximizes agent available to customers.

8 Claims, 17 Drawing Sheets

U.S. PATENT DOCUMENTS

| | | |
|---|---|---|
| 5,946,386 A | 8/1999 | Rogers et al. |
| 5,946,387 A | 8/1999 | Miloslavsky |
| 5,946,388 A | 8/1999 | Walker et al. |
| 5,951,638 A | 9/1999 | Hoss et al. |
| 5,960,073 A | 9/1999 | Kikinis et al. |
| 5,963,632 A | 10/1999 | Miloslavsky |
| 5,970,065 A | 10/1999 | Miloslavsky |
| RE36,416 E | 11/1999 | Szlam et al. |
| 5,982,856 A | 11/1999 | Cohn et al. |
| 5,982,873 A | 11/1999 | Flockhart et al. |
| 5,991,394 A | 11/1999 | Dezonno et al. |
| 5,995,614 A | 11/1999 | Miloslavsky |
| 5,995,615 A | 11/1999 | Miloslavsky |
| 6,021,428 A | 2/2000 | Miloslavsky |
| 6,046,762 A | 4/2000 | Sonesh et al. |
| 6,170,011 B1 | 1/2001 | Macleod Beck et al. |
| 6,173,052 B1 | 1/2001 | Brady |
| 6,173,053 B1 | 1/2001 | Bogart et al. |
| 6,175,563 B1 | 1/2001 | Miloslavsky |
| 6,175,564 B1 | 1/2001 | Miloslavsky et al. |
| 6,185,292 B1 | 2/2001 | Miloslavsky |
| 6,212,178 B1 | 4/2001 | Beck et al. |
| 6,289,094 B1 | 9/2001 | Miloslavsky |
| 6,330,327 B1 * | 12/2001 | Lee et al. ................. 379/266.1 |
| 6,393,015 B1 | 5/2002 | Shtivelman |
| 6,517,587 B1 * | 2/2003 | Satyavolu et al. ........ 715/501.1 |
| 6,687,241 B1 * | 2/2004 | Goss .......................... 370/352 |
| 6,707,899 B1 * | 3/2004 | Saito et al. ............ 379/202.01 |
| 6,732,156 B1 | 5/2004 | Miloslavsky |

\* cited by examiner

Customer Schedule Manager

CUSTOMER COMMUNICATION SERVICE SYSTEM

This application claims the benefit of U.S. Provisional Application No. 60/174,961, filed on Jan. 7, 2000. The present invention relates generally to customer communication services. More particularly, the invention is a system and method for managing and integrating multimedia customer and customer-client interactions.

BACKGROUND

Customer communication services have traditionally involved using call center technology to allow customers to contact a service agent via a telephone or for allowing agents, such as telemarketers, to contact customers. A call center is a central place where customer and other telephone calls are handled by a service organization, usually with some amount of computer automation. Typically, a call center has the ability to handle a considerable volume of calls at the same time, to screen calls and forward them to someone qualified to handle them, and to log calls. Call centers are used by mail-order catalog organizations, telemarketing companies, computer product help desks, and any large organization that uses multiple telephones to sell or service products and services.

Some companies have a network of geographically distributed call centers for serving customer's needs. Such distributed call centers often provide redundancy and decentralization.

In a call center, agents handle telephone communications with callers. Each agent is typically assigned to a telephone connected to a central switch, which is in turn connected to a public switched telephone network (PSTN). The central switch may be one of several types such as an telephony switching apparatus (TSA), private branch exchange (PBX), or PSTN. If the call center consists of just a central switch and the telephones connected to it, the routing capabilities are limited. There may also be limits in the range of computer processes that may be performed.

To achieve greater computerization of call centers, advances have been made in the use of computers to manage telephone calls, known as computer telephone integration (CTI). CTI is used to describe the computerized services of call centers such as those that direct a phone call to the right department at a business that is being called. It is also sometimes used to describe the ability to use a personal computer to initiate and manage phone calls. CTI applications provide the ability to do one or more of the following:

- Authenticate callers. Using one of several standard methods, the telephone number of the caller can be screened against a database,
- Recognize a voice, either for authentication or for system commands, such as digit recognition,
- Determine how to process a call (for example, by forwarding it to the appropriate person or department) using live, recorded voice, or touch-tone entered input,
- Provide interactive voice response (IVR) to callers,
- Match the number of a caller with a customer record and display it for reference when talking to the caller,
- Manage voice or video conferences,
- Collect and display pending live calls or messages that have been left by callers,
- Receive fax messages and route them to appropriate fax machines,
- Pre-dial callers for outbound calling such as telemarketing,
- Initiate a smart agent application to provide help with the caller's request based on call input.

When calls are received at a CTI call center, they are placed into a queue until an agent is available to take the call. In the CTI call center, typically an agent using a telephone station connected to the central switch also has access to a computer terminal. The central switch may consist of hardware and software that control a call from the time it arrives until the service agent answers it. The central switch provides the interface with the customer (allowing the customer to hear messages and music, etc.) and may also perform other functions such as gathering information about the call and the customer before routing the call to an available service agent. The Telephony Switching Apparatus (TSA) software routes the call to a knowledgeable and available service agent using knowledge obtained about the caller and the caller's needs.

In addition to using the medium of voice, other media are used to attempt to efficiently handle the large volume of customer contacts processed by a call center and to improve caller customer service. Other media include chat, voice mail messages, electronic mail, facsimile messages and video messages. The agent's computer terminal may be used to access databases of stored data and information about the call and caller may also be displayed on the computer screen for the agent. The computer terminal may be interconnected by a network to a server, which contains the CTI software.

However, many of these other media are not integrated into the call center processing. There is often no way to track the performance of the call center for some or all of the media. Usually, the call center system does not capture and process these different communication media seamlessly and simultaneously. The result is that the service agent does not have an integrated communication interface with the caller which can result in a slower and less than satisfactory processing of the call.

SUMMARY

The present invention is a call center system that integrates customer communication media into a single service agent desktop, which may be accessed through a variety of communications networks, including a global communications network. The invention is a scaleable, geographically distributed system that receives, routes, manages and reports on multi-media customer communications.

Inbound and outbound voice and video calls, including predictive-dial calls, are seamlessly routed throughout the system, along with electronic mail, chat, web-callback and other information. The system supports voice communication using both a standard public switched telephone network (PSTN) and voice over Internet Protocol (IP) network. The present invention manages communication workflow and provides configurable skills-based routing to deliver work to the appropriate queues, such as a live agent or an automated system. It integrates the customer and client's data across all media such as voice, electronic mail, facsimile, voice mail and video. The system provides transparent geographic distribution so that all calls, email, chat, and other workflow tasks can be routed across a metropolitan area, the entire country, or throughout the world. The system can contain any number of physical or virtual TSAs each of which can integrate isolated agent groups composed of as few as a single agent or multiple agents.

The present invention provides for enterprise calling and task queuing with skills-based routing. The agent who has been selected to receive a workflow event can be secured for that event.

The present invention allows for a distributed interface: the call center can be located at a customer's site or can be located virtually anywhere. The customer's agent can then connect with the system using a personal computer, and a telephone connection and a communications network interface, such as a global communications network.

The system provides for customization of voice response unit (IVR) routing menus, enables customer-specific routing, and enables simultaneous voice and an information screen-pop to the agent desktop. The system software application runs under the Windows® operating system and can be integrated with other operating systems based on its components-based architectural model.

BRIEF DESCRIPTION OF THE DRAWINGS

These and other features, aspects and advantages of the present invention will become better understood with regard to the following description, appended claims and accompanying drawings where:

DETAILED DESCRIPTION OF THE DRAWINGS

Referring now, in detail, to the present invention, embodiments and examples of which are illustrated in the accompanying drawings, the invention is directed to a system and method for managing and integrating multimedia customer and customer-client communications. Throughout this description, the term "client" or "caller" is used to refer to the caller, keeping in mind that the caller may be connected to the agent via a traditional voice line or through a global communications network such as the Internet.

Figure 1:
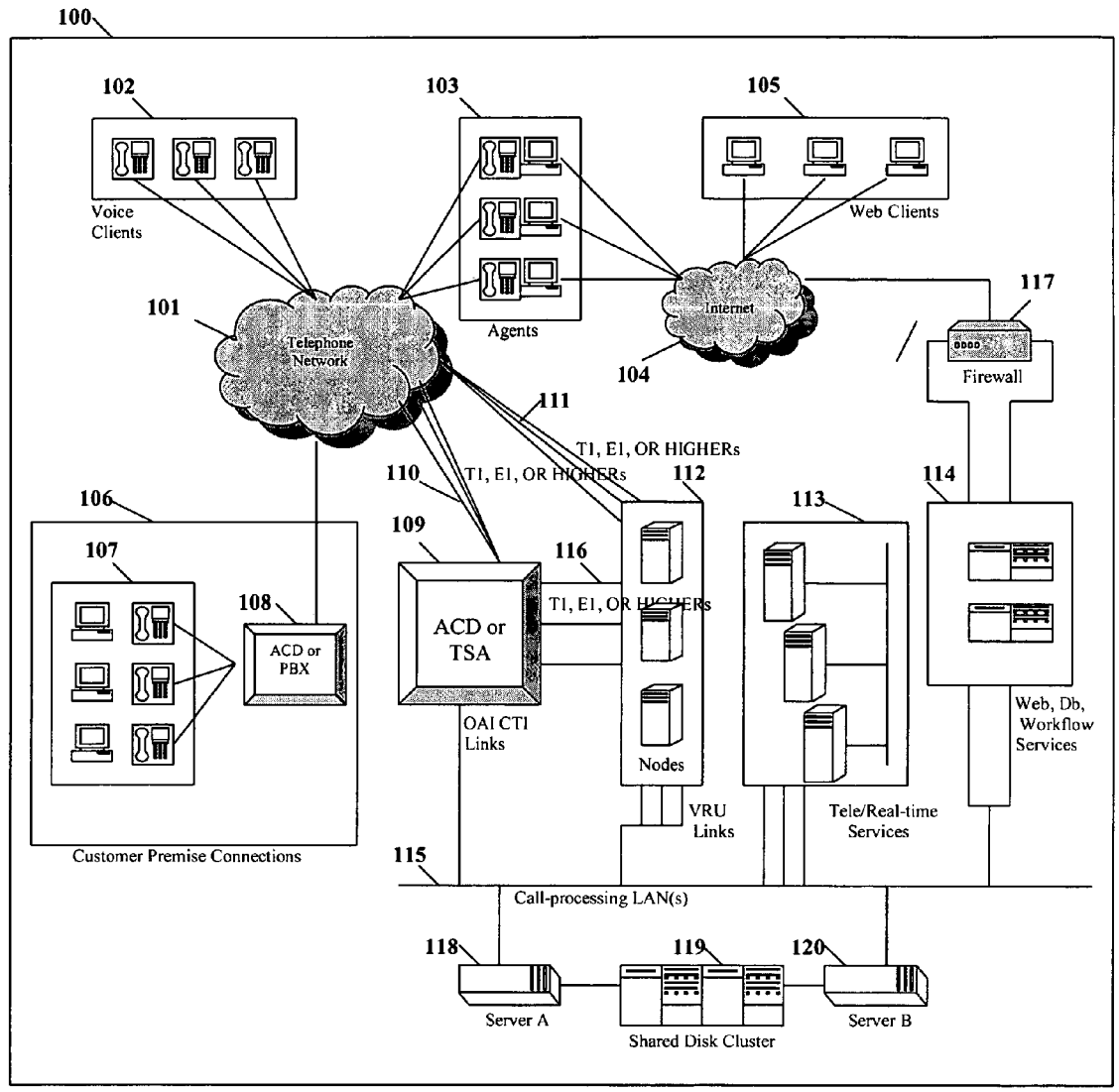
FIG. 1 is a block diagram of the components of the invented customer communication service system (CSS)

Referring now to FIG. 1, components of the invented customer communication service system (CSS) 100 are shown. The CSS 100 contains an interface to a telephone network 101. The telephone network 101 provides connections to voice clients or callers 102, and to agents 103 who receive and process calls from the voice clients. The agents 103 also have a connection or connections to the Internet 104. Each agent 103 may be hosted on a personal computer, a workstation, a network terminal or other system and has a display apparatus (such as a CRT or VDU) and at least one input apparatus (such as a keyboard and mouse) allowing the agent to view data and enter information. Clients 105 may connect through the Internet 104 to send and receive information with the agents 103.

Agents 103 may be geographically distributed at any location that provides a means for connecting to the telephone network 101, or the Internet, or both. For example, agents 103 may be located at several different customer premise sites 106 or may comprise individuals working from home or office sites.

In the embodiment shown in FIG. 1, a connection is made through the telephone network 101 to customer premise connections at a customer site 106, where one or more agents 107 answer client calls and service requests. This customer site 106 contains one or more Telephony Switching Apparatus (TSA) switches, automatic call distributors, or PBXs 108, which are connected to a system TSA switch 109, via the telephone network 101. In the embodiment shown by FIG. 1, switches 108 and 109 are connected through telephone network 101 via high-speed dedicated telephone lines (T1, E1, OR HIGHER lines) 110. Multiple TSA switches 108 and 109 may be used as needed, for each customer site.

The system TSA switch 109 is a conduit for all calls to the customer site and to voice clients 102 and provides fault-tolerant call processing and scalability to a large number of non-blocking ports to host a pool of sharable voice trunks for connectivity between callers and subscribing agents. TSA switch 109 is connected to voice clients through the telephone network 101, also via T1, E1, OR HIGHER lines 110. The TSA switch 109 provides a holding place for calls that are awaiting routing, as well as an ability to reject unwanted incoming calls. The TSA switch 109 supports conference functions among subscribing agents and supports call key referencing that enables voice/data call transfers, by associating context data with voice calls. In the event that a failure occurs, the TSA switch 109 can use T1, E1, OR HIGHER lines 111 to transfer impacted calls from a failed telephony resource node to an alternative telephony resource node 112.

The customer site 106 may monitor call processing activity by agents 103, agents 107, or both sets of agents.

Telephony resource nodes 112 are connected with the agents 103 across the telephone network 101, via T1, E1, OR HIGHER lines 111. Telephony resource nodes 112 are connected with TSA switch 109, via T1, E1, OR HIGHER lines 110. The telephony resource nodes 112 provide telephony processing functionality in support of the TSA switch 109. The nodes 112 preferably comprise one or more computer servers, operating using a Windows or UNIX operating system. To ensure continuous, round-the-clock system availability, the invented system includes multiple telephone resource nodes 112. The following comprise examples of functionalities, which telephony resource nodes 112 may provide:

Playing of recorded audio announcements to users;

Collecting dual tone multi-frequency (DTMF) digit strings from users;

Providing a voice path to dynamically connected subscribing agents using traditional phone networks;

Optionally providing Voice/Internet Protocol (Voice/IP) connected to subscribers whose Internet connection 104 comprises a high bandwidth connection;

Providing speech recognition functionality for collecting information from users;

Providing text to speech functionality; and

Providing voice mail and fax functionality.

The TSA switch 109 and the telephony resource nodes 112 are connected directly to each other via high speed dedicated T1, E1, OR HIGHER ties 116 and are also connected to a local area network (LAN) 115. The LAN 115 may comprise a protected, real-time, call-processing LAN. In the embodiment shown in FIG. 1, the LAN 115 is provided by Server A 118 and Server B 120 operating about a shared disk cluster 119. Multiple LANs may be used as needed, wherein multiple servers are partitioned across multiple hubs.

The TSA switch 109 is connected with the telephony servers 113 across LAN 115. In the embodiment shown in FIG. 1, this is accomplished using open application interface computer-telephony integration (OAI CTI) links from the TSA 109 to the telephony servers 113 via the LAN 115. The telephony resource nodes 112 are connected to the telephony servers 113 via the LAN 115 also. In the embodiment shown by FIG. 1, this is accomplished using voice response unit (VRU) (also known as interactive voice response (IVR)) control links to the telephony servers 113 via the LAN 115. VRU (also know as IVR) is a method of obtaining information from a caller by prompting for specific data.

Telephony and real-time services functions are located within one or more telephony and real time services server computers 113 connected to the LAN 115. The telephony and real-time services functions provided by the server computers 113 may include controlling real-time voice processing services, maintaining application state, redundancy, load-sharing, and fault recovery. The telephony and real-time services server computers 113 are connected via any suitable means for tying servers together to provide a coherent functionality. In one embodiment, this means comprises a replicated shared memory net.

Workflow management, provisioning system services, billing and accounting services, database services and web services are located within one or more server computers 114 connected to the LAN 115. The server computers 114 are also connected to the Internet 104, and this connection may take place across a firewall 117. The workflow managing function provided by computer servers 114 manages the distribution and control of media events and client service requests. Media events include email, on-line chat, self-help, web-based support, IP telephony and video, voice, voice mail, and facsimile. The database services function provided by computer servers 114 stores configuration, provisioning, statistical and account activity information along with any information that must be reserved and referenced by other system components. The web services function provided by computer servers 114 manages the Internet based interfaces of the system. The provisioning system provided by computer servers 114 manages and references all subscriber-specific provisioning information. This includes retention of definitions for agents, phones, skill and capability ratings, plan rates and other subscriber-specific configuration information. The billing and accounting system provided by computer servers 114 stores all information needed to generate or reference billing for subscribers.

Now referring to FIG. 2, a high-level block diagram 200 is shown, illustrating the major subsystems of the CSS described with reference to FIG. 1. A telephone network 201 connects client telephones 210 and agent telephones 209 to telephony services 202. Telephony services 202 is responsible for managing all TSA switch and telephone resource activity, both described with reference to FIG. 1. This includes, for example, voice, voice mail, interactive voice response (IVR), and facsimile-related functionalities.

The public interfacing and media services functions 205 include secure web page, file transfer protocol (FTP), application level interfacing, and all other services that involve public interfaces. The public interfaces include web services, file transfer services, e-mail services, and application interfacing services. The backend services functions 204 may provide a host of miscellaneous backend services, including, for example, billing, historical subscriber data, and system anomaly diagnosis. The shared services function 203 includes services used by the telephony services 202, public interfacing and media services 205, and backend services 204, such as workflow management, resource matching and activity logging services. The shared data repository 206 is used to store common files that are used by various system components. These files may include, for example, audio files that are used for subscriber announcements and voice mail, electronic mail and web content files. Customer application suites 208 may comprise Internet-based tools that are supplied to customers to enable them to communicate with the CSS via the Internet 207.

Figure 2:
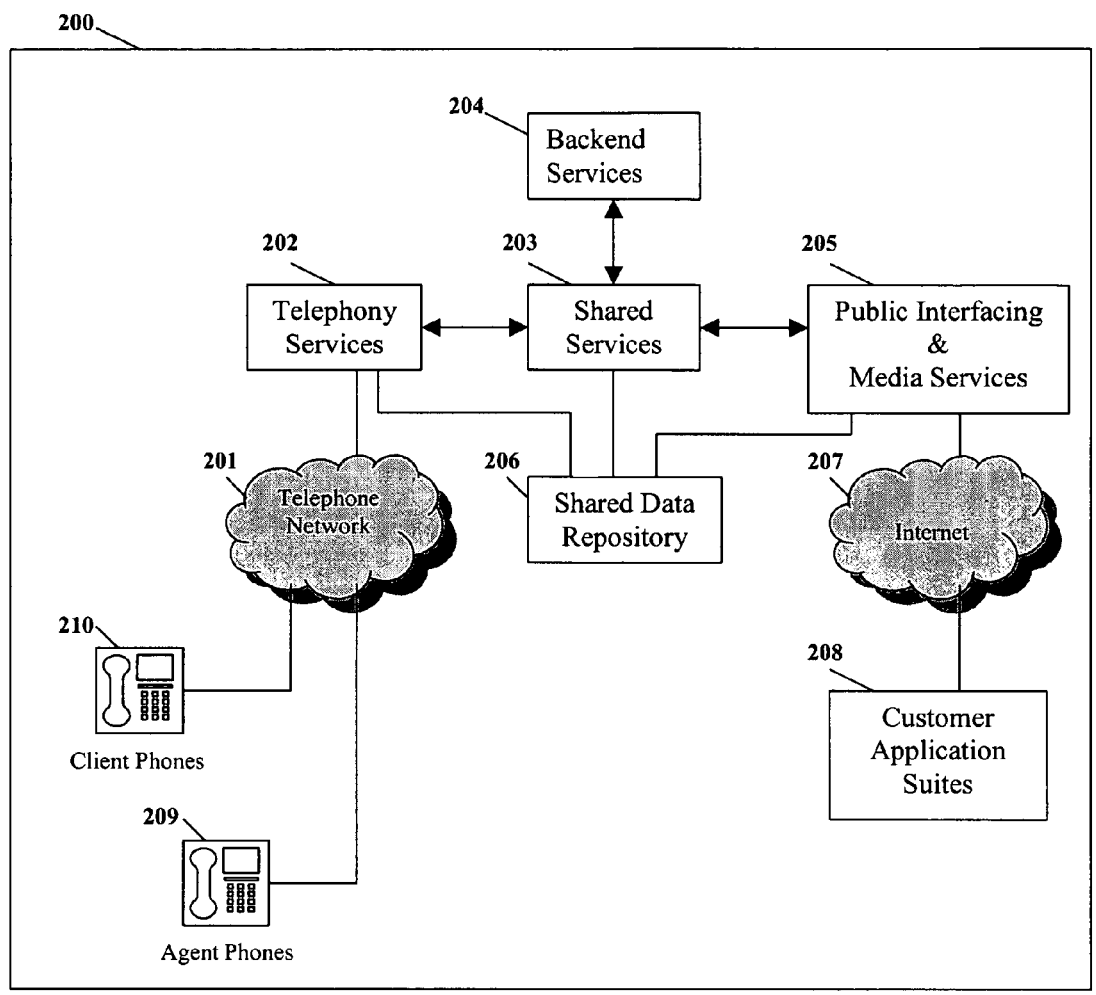
FIG. 2 is a functional block diagram of the major functions of the CSS.
Figure 3:
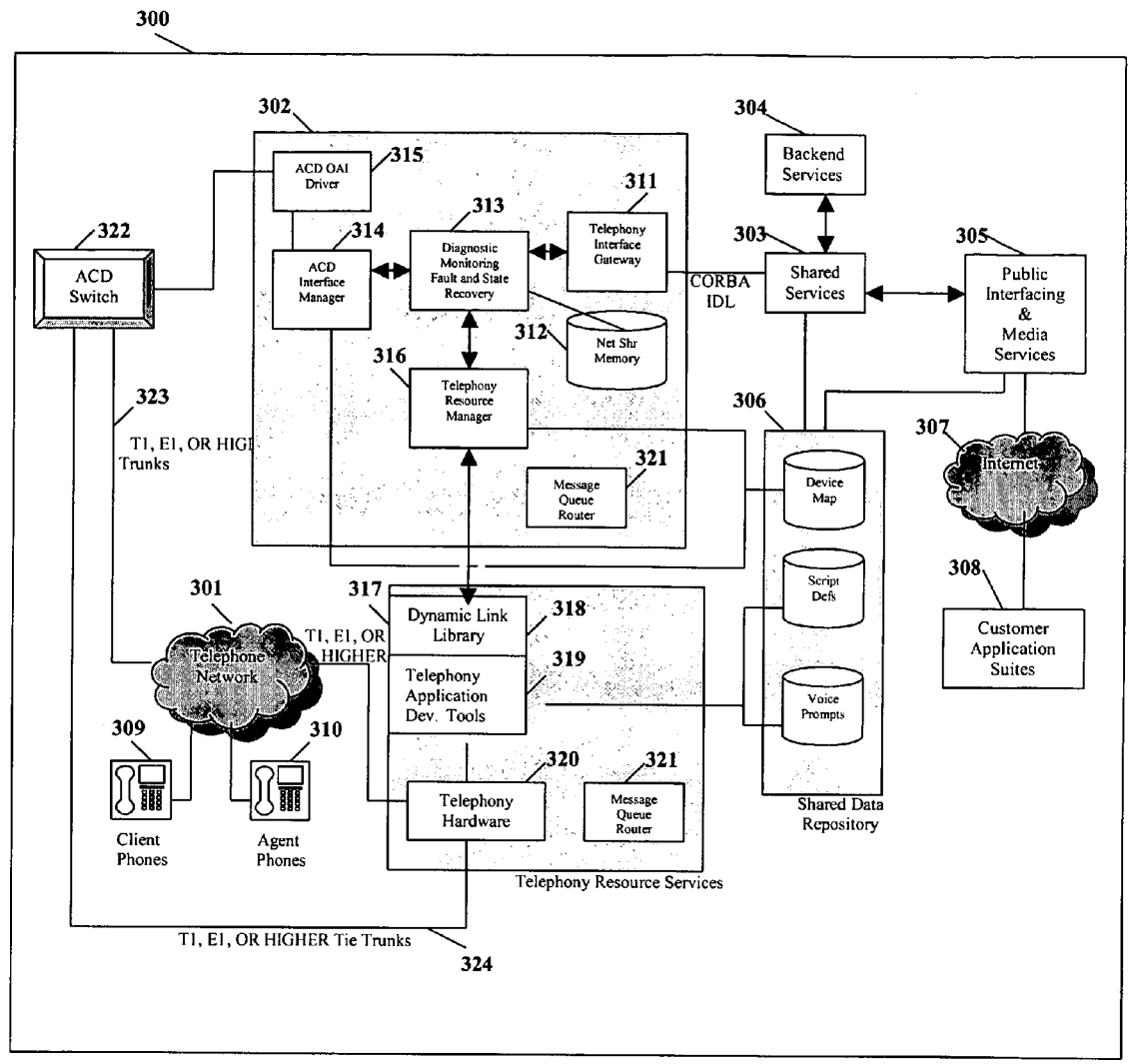
FIG. 3 is a functional block diagram of the CSS showing the telephony services function.

Now referring to FIG. 3, a functional block diagram 300 is shown, which further illustrates the telephony services and shared data repository functions of the current invention. Telephony Services 302 (202, FIG. 2) is responsible for managing all activity of the TSA switch 322 (109, FIG. 1) and telephony resources (112, FIG. 1). Telephony services maintain application state and ensure fault recovery. Within the telephony service components, the telephony interface gateway 311 acts as an interface for all voice systems. It manages the external workflow interface, performs external route matching, provides basic telephony services, manages voice resource and scripting, logs activity and does error reporting. The telephony interface gateway 311 interfaces with shared services 303, via any suitable means that facilitates communication among object-oriented systems or software. In the embodiment shown in FIG. 3, this is achieved using Common Object Request Broker Architecture and Interface Description Language (CORBA/IDL).

The state and connection status of all active calls is recorded in the network-shared memory 312. In the event of a telephony server or resource node failure, the data stored in the shared memory 312 allows for the recovery of the state of active call connections and the redistribution of connections as needed between the surviving server or resource nodes. The diagnostic monitoring, fault and state recovery function 313 acts in support of the telephony interface gateway 311, the TSA interface manager 314, and the telephony resource manager 316, by ensuring the integrity of the voice systems of the CSS. The diagnostic monitoring, fault and state recovery function 313 uses the recorded data of the network shared memory 312 for fault and state recovery. It performs automated diagnostic monitoring, automated restarting of failed software components, redistributes active connections after a hardware component failure and resynchronizes with workflow management (in the shared services function 303) after a component failure.

The TSA switch interface manager 314 manages the CTI links to the TSA switch 322. This management includes abstracting CTI-specific controls of the TSA switch 322, to provide switch portability and managing recovery from temporal links communication problems. The TSA interface manager 314 connects to an TSA open application interface (OAI) driver 315 that provides application control of the TSA switch 322. The TSA OAI driver 315 is linked to the TSA switch 322, preferably by Transmission Control Protocol/Internet Protocol (TCP/IP) or RS232 CTI standard links or other means. The TSA switch is connected to client phones 309 and agent phones 310, across the telephone network 301, via T1, E1, OR HIGHER trunks 323. The TSA switch 322 is connected with the telephony hardware of the telephony resource node 317 via T1, E1, OR HIGHER tie trunks 324.

The telephony resource manager 316 manages interfaces to telephony resources in telephony resource node 317, including connection management, load balancing and fault recovery. The telephony resource node 317 includes telephony resource dynamic link library (DLL) 318, which facilitates interfacing between the telephony resource manager 316 and the telephony applications that provide control software for the voice subsystem 319. The voice subsystem, in turn, controls the voice interface telephony hardware 320 on the telephony resource node 317. Functions supported on the voice subsystem include playing an announcement, playing a tone, executing a parameterized menu/prompt; capturing a digit string from a caller, playing scripts that offers an agent a call, recording message from a caller, allowing an agent to access a voice mailbox and playing a message using text to speech.

The Message Queue Routers (MQRs) 321 are used to route and reroute requests between client/server telephony components. Specifically, the MQRs 320 are used to maintain communications between the Telephony Services 311 and other system components. The MQRs 321 help to ensure automatic and transparent recovery from component failures. Should connectivity be lost between two cooperating components, MQRs 321 will automatically reroute requests to surviving (redundant) components. To enable this function, MQRs 321 constantly monitors the health of the communications channels to nodes with which it is communicating. Should a failure occur, the system will continue to function with no functionality loss.

The shared data repository 306 is used to store common files that are used by system components. They include a device map, script definitions and voice prompts which are used for subscriber announcements and voice mail. The shared data repository files 306 are accessible by the telephony resource nodes 317, the telephony services 302 and through the public interfacing and media services function 305. The shared data repository 306 may also be used to store files related to email and web content.

Each telephony resource node 317 provides telephony processing functionality in support of the TSA switch 322. In one embodiment, each platform is an industrial-grade, passive-backplane system with a single board computer, and will run the Microsoft Windows operating system. Additionally, each platform will host telephony cards (for example, Dialogic) and fax cards. To ensure 24×7 system availability, at least three telephony resource nodes are maintained.

Telephony resource services 317 will provide the following functionality:
  Playing of recorded audio announcements to users (both callers and subscribing agents);
  Collecting DTMF digit strings from users;
  A voice path to dynamically connected subscribing agents, using the traditional phone network;
  An optional Voice/IP connection to dynamically connected subscribers who are using a high-bandwidth Internet connection;
  Provides speech recognition functionality for collecting information from users;
  Provides text-to-speech functionality;
  Provides menu node processing to client components; and
  May provide voice mail and fax functionality.

Figure 4:
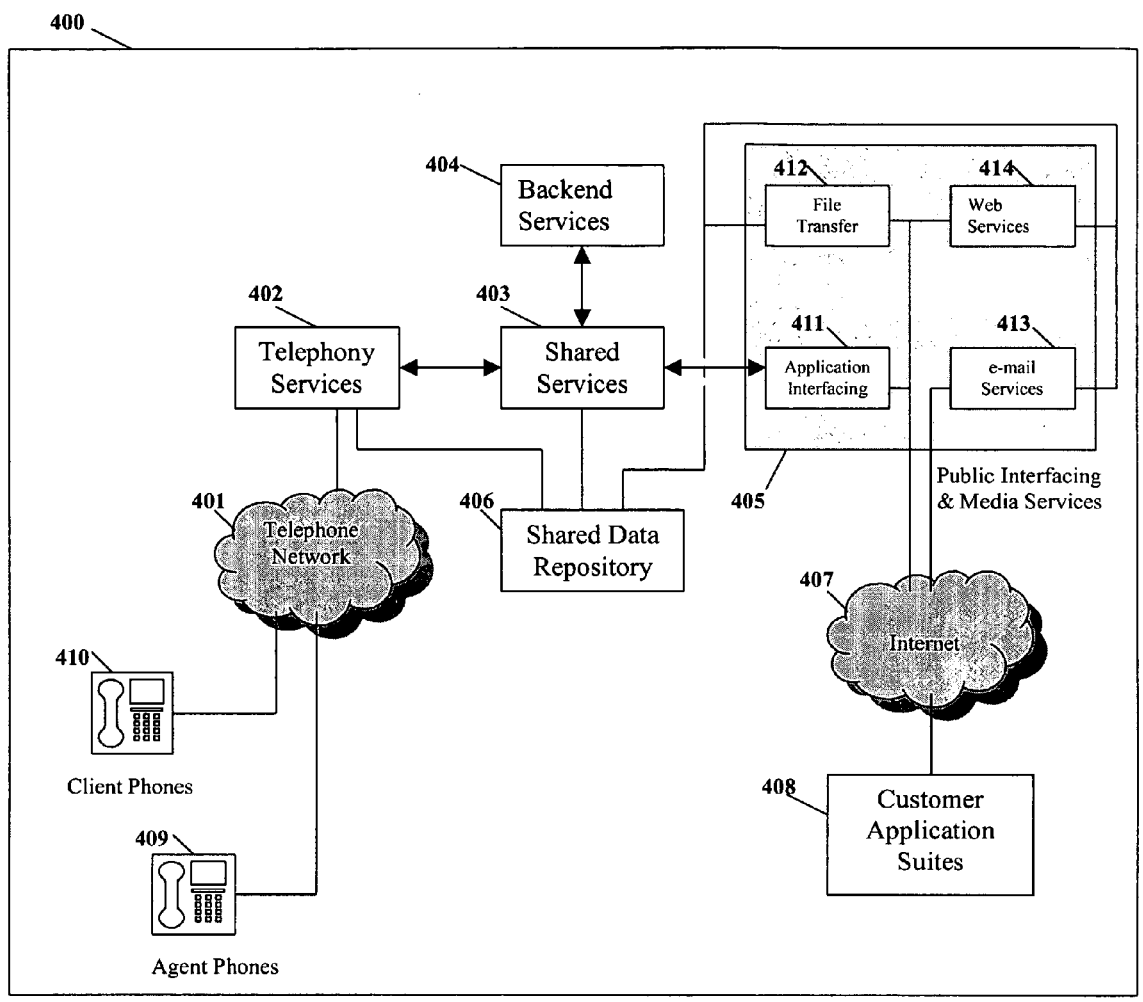
FIG. 4 is a block diagram of the CSS showing the public interfacing services.

Now referring to FIG. 4, a functional block diagram 400 is shown, which further illustrates the public interfacing and media services functions of the current invention (205, FIG. 2). The public interfacing and media services functions 405 include application-interfacing services 411, file transfer services 412, e-mail services 413 and web services 414. The application interface 411 contains a public Hypertext Transfer Protocol (HTTP) interface to a web browser and to client applications. The file transfer services 412 allow for the downloading of subscriber applications and for uploading audio and other provisioned subscriber files. The e-mail services 413 manage incoming and outgoing electronic mail and stores subscriber electronic mail. The web services 414 comprise managed web interactions including chat services and web page hosting. The public interfacing and media services 405 (represented as 205 in FIG. 2) is connected to the other elements of the CSS as described in FIG. 2.

Figure 5:
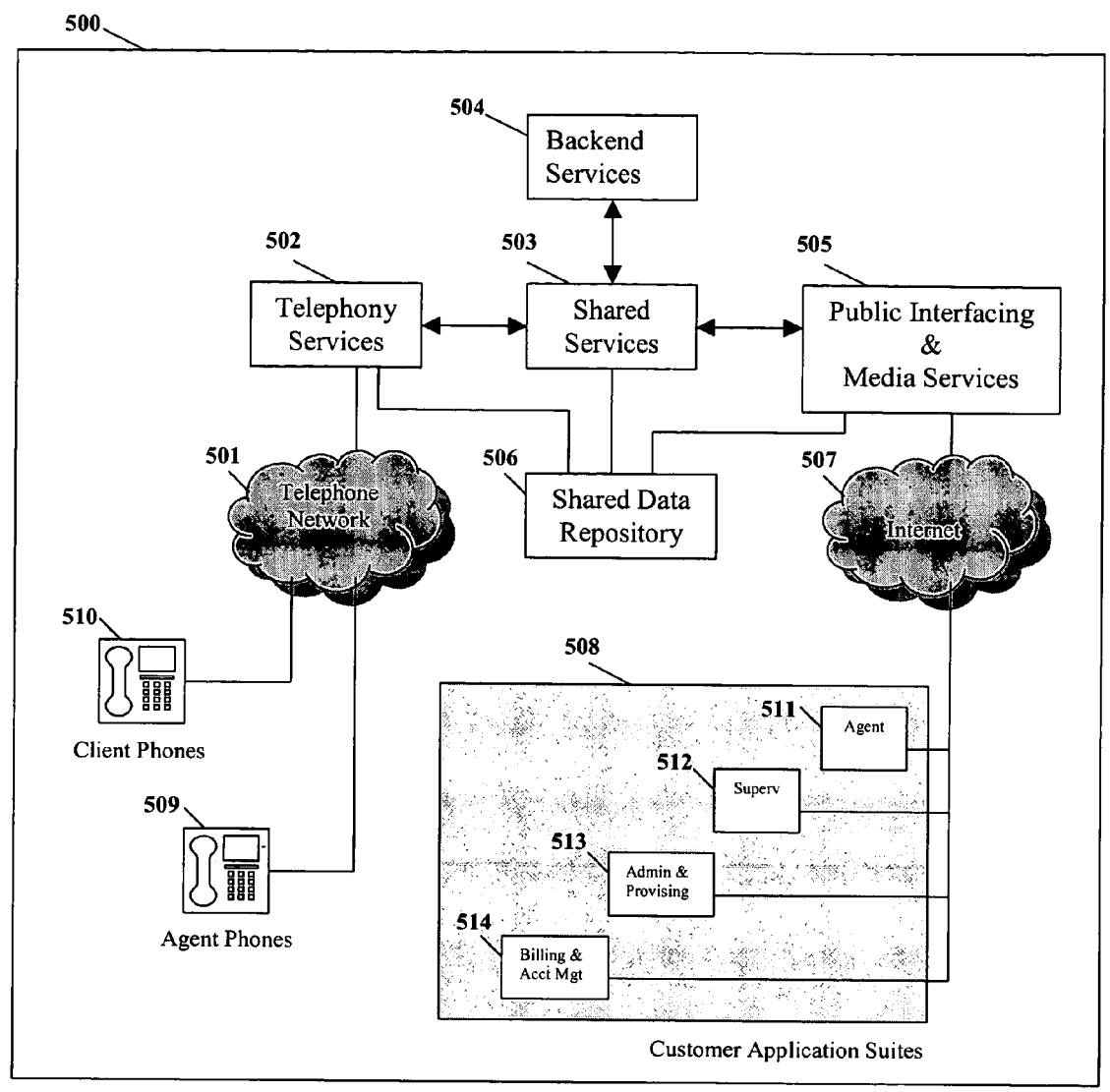
FIG. 5 is a block diagram of the CSS showing the client application suites.

Now referring to FIG. 5, a functional block diagram 500 is shown, which further illustrates the customer application suites of the current invention (208, FIG. 2). The customer applications include an agent application 511 which may be browser based, that contains the suite of software tools that are accessible by the subscribing agents. The supervisor application 512 contains the suite of software tools that are accessible by the subscribing supervisors. It supports monitoring of both the current and historical status of the CSS operation. Administrative and provisioning suites 513 allow subscribers to setup and maintain their CSS services. These include tasks such as reserving toll-free numbers, adding authorized agents and controlling contact routing. Administrative and provisioning suites 513 use a combination of web-based and Windows based applications.

Billing and account management 514 allows the generation of, and access to, customer billing information. It includes the processing call detail records, generation of billing summaries, compilation of provisioning and subscription related charges, problem research tools, billing statement generation, secure customer web page communication and other elements related to customer billing. Billing and account management 514 also includes graphical and numerical views of call flows and operational productivity. Each of the customer applications is individually connected to the CSS via the Internet 507.

Figure 6:
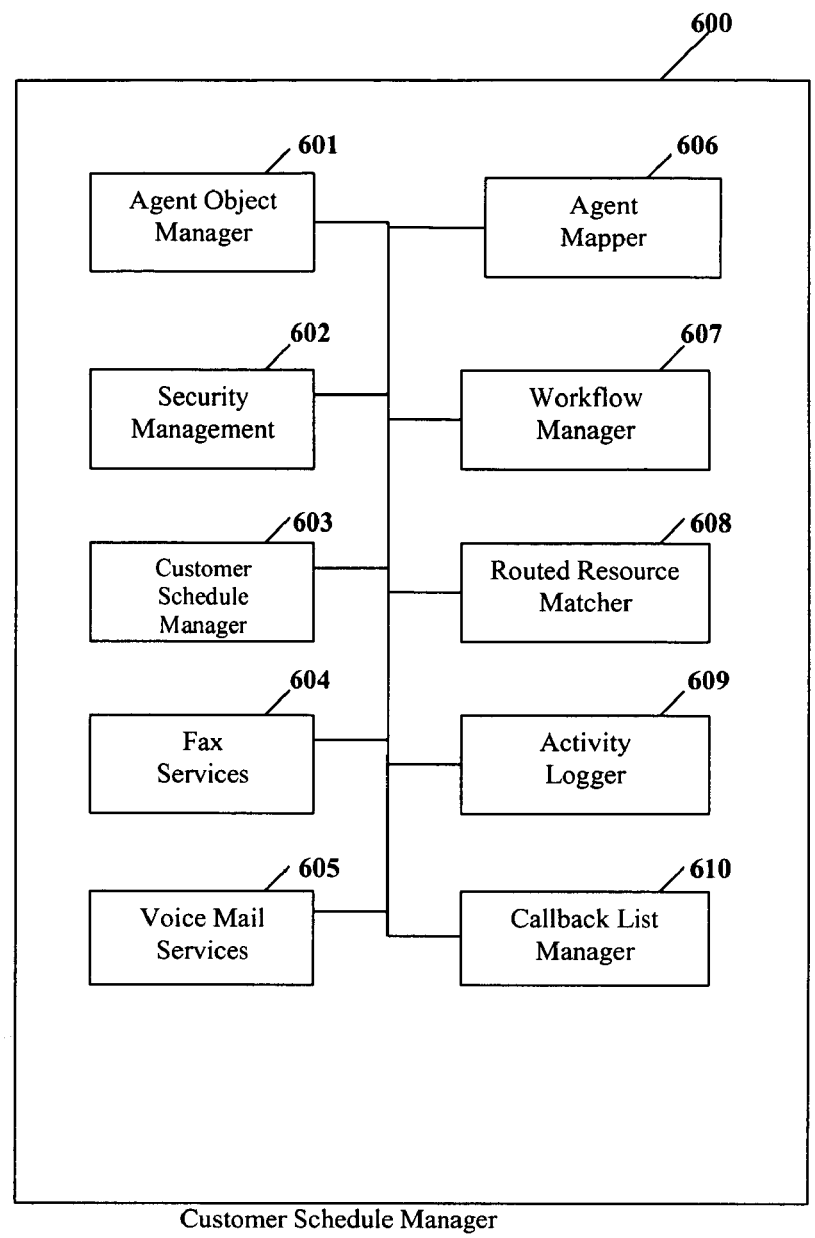
FIG. 6 is a block diagram of the shared services system components.

FIG. 6 is a block diagram of the shared services system components 600. The shared services include those that are used by the telephony, public interfacing and back-end services. The shared services 600 include the agent object manager 601, security manager 602, customer schedule manager 603, fax services 604, voice mail services 605, agent mapper 606, workflow manager 607, routed resource matcher 608, activity logger 609, and callback list manager 610. The agent object manager 601 is the central point of control for all activities related to a specific subscriber. Responsibilities of the agent object manager 601 include the determination of when a subscriber can received new connections, management of client interfaces to telephony services, workflow manager, resource matcher, and other major subsystems.

The agent mapper 606 is a service that is used to map a specific media event (for example an inbound call or Internet chat) to a specific subscriber.

The workflow manager 607 is responsible for deriving high-level actions that control how an agent contact or a subscriber connection is handled. Workflow management 607 is controlled by an administration graphical user interface (GUI) that can either be executed by supervisors or by system administrators. The routed resource matcher 608 is primarily responsible for routing contacts to agents (which may be real agents or virtual/software agents). To perform its task, the resource matcher must be informed of real-time state changes whether they occur at an agent or a contact source (for example: call, chat, and the like). The activity logger 609 maintains a redundant log of all events that are required to generate subscriber billing or views of historical activity that can be monitored by subscriber tools. Example event include subscriber signup or provisioning-related events, telephony connection events, agent login and logout, and the like. The activity logger 609 can be used to generate input into a standard billing package, or monitoring data into a custom or canned reporting package. The voice mail services 605 allows for delivery using a synthesis of traditional telephony and the Internet. Using this approach, traditional telephony will be used by third party customers to leave voice mail messages. However, subscriber voice-mail access may be delivered through traditional means (i.e., the mailbox owner's telephony) or through the Internet (probably an encrypted MP3 or other encrypted and compressed audio file supplied as an email attachment).

The customer schedule manager 603 allows both resource matching and workflow to be able to modify functional behavior based upon agent-defined schedules. For example, a customer might define one schedule for weekdays, another for weeknights, another for Saturday morning, another for one type of holiday, and the like. Schedule management is a subsystem that allows resource matching and workflow to be customized according to date and time dependencies of particular subscribers.

The security manager 602 is responsible for ensuring that users who attempt to access and perform an operation are authorized to do so. The callback list manager 610 maintains a list of calls that are to be returned by the agents, which include web callback. The customer enters a telephone number (and optimally other qualifying data) and presses a send button. The request is then queued within the system until a suitable agent is available. The system then dials the customer and connects the customer with the agent, treating the call from that point on similar to any other telephony channel connection.

Figure 7:
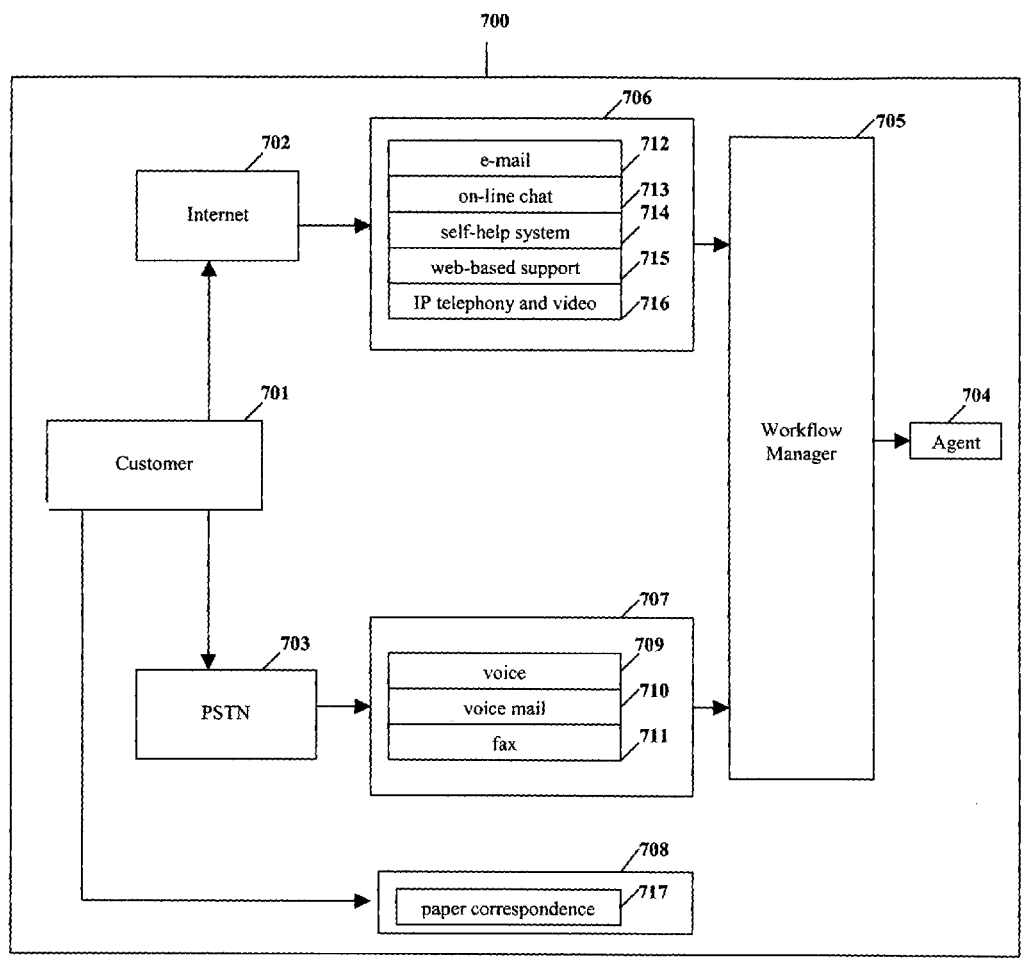
FIG. 7 is a block diagram of the CSS services.

FIG. 7 is a block diagram of the CSS services. The customer 701 may communicate with an agent 704 via communication channels that include the Internet 702 or Public Switched Telephone Networks (PSTN) 703. An agent 704 can conduct concurrent customer communication sessions over multiple media. The agent 704 can handle customer communication from a web page via the Internet 702 or via the PSTN 703. Additionally, the agent has a choice of ways to conduct the communication and may choose additional mechanisms (communication channels 706–708). All communication types are workflow enabled and pass through the workflow manager 705. This means all communications, regardless of type, can be viewed from a common interface, routed and reported using workflow definitions. Communication channels 706–708 include voice 709, voice mail 710, fax 711, email 712, on-line chat 713, self-help support 714, web-based support (including callback) 715, Internet protocol (IP) telephony and video 716 as well as traditional paper correspondence 717.

Voice 709 functions include queuing the call until a suitable agent is available and then the call will be connected to the agent. The agent that receives the call may be anywhere: in a formal contact center, in a satellite office, or even at home. In fact, an agent can be located wherever there is a direct inward dial (DID) telephone or Internet access, or both. Wherever the agent needs to be located, the system can reach him or her and allow the customer's query to be handled as quickly and efficiently as possible. The agent can handle multiple voice calls. The typical TSA restriction of two calls, one call in the headset and one on-hold, is not a restriction with the system. This capability is of special benefit during a technical support session where the customer may have to reboot their computer or reload software. While one customer is doing the rebooting/reloading, the agent can take additional calls. In the event the first customer requires assistance, a touch on the keypad will immediately be brought to the agent's attention by the system. The agent can respond to the customer via a variety of media. This is all due to the processing of the workflow manager 705. For example, known customers (those who the system has identified) can have the option to leave a voicemail message instead of remaining in a calling queue. If the agent is unable to return a call before end of day, the system can be configured to respond back to that customer via email to let them know that the call will be returned the next business day. The system allows the customer's calls to be routed through the interactive voice response (IVR) system. This allows the customer to perform certain transactions without involving an agent, or prompts for data about the customer so they may be routed to the agent best equipped to handle their call. Examples of this include: prompting the customer to enter an account number or an order number and thereby be recognized for 'special handling' and be routed to a premier agent. Alternatively, the customer may indicate to the IVR the nature of their query and thereby be routed to a subject matter expert for their question or issue. The customer on-hold can choose to leave a voice message for an agent instead of continuing to wait, without loosing their place in queue. When the voice-message arrives at the agent's desktop (instead of the voice call) the agent places a callback to the customer. The system also supports real-time and historical reporting on voice activities.

Skill-based routing allows calls to be delivered to agents or agent queues based upon customer defined "skill" criteria. Any data that can be determined about the customer and the reason for their inquiry can be used as part of the decision of which agent should handle the inquiry.

The system supports standard fax (facsimile) feature 711 functionality with the all the skill-based routing capabilities provided with voice. "Standard" refers to those features that are common industry wide. These features include, but are not limited to: faxback, receiving inbound fax, sending outbound fax and fax broadcast.

Faxback provides the agent with the ability to provide fulfillment to a caller via fax instead of mail. This should be available on a manual basis or automated through an IVR. For manual operation the agent verbally confirms an order with the caller and then requests their fax number. The agent "clicks" a button on the GUI to send a confirmation letter. The confirmation letter is then sent to the caller via fax. For automated operation an toll free support number is dialed for Company X technical support documentation, the caller is prompted by IVR to "press" or "speak" needs, (i.e.; press one for printer, two for disk drives). The caller presses "1" and hears a listing of documents available, the caller follows the prompts to specify the appropriate document(s) and provides the receiving fax number. The IVR then routes the call appropriately and the fax is sent to the caller.

Receiving inbound fax includes the ability to receive faxes from external sources, (for example, inbound calls.) The faxed (electronic) image is then made available for viewing from the agent's desktop. For example, a customer receives a subscription renewal notice via postal mail. One of the options for reply is via fax. The customer fills out the renewal form and faxes it to a specified toll free number. The fax is received by and the electronic image is formatted and sent to deferrable work queue. This enables faxes to be treated like emails. The system also provides the customer with the ability to receive faxes and direct them to a specific agent or agents. For example, the caller dials an toll free number, and is prompted to dial the agent's extension, if known. The workflow engine routes the fax appropriately and it appears in the specified agents work queue. By applying skill-based routing, and an IVR the caller may be prompted with spoken options, such as "press one, for Spanish," "press two for English,"—after pressing "one" the fax is routed to a "Spanish/reading & speaking" agent. The fax could also be sent to a general system queue whereby the work is parsed to any available agent.

The send outbound fax function allows the agent to fax information to the customer. The agent has the ability to create a fax image of a portion of the screen and send it to the customer specified fax number.

The fax broadcast function allows an image/document to be sent via fax to a broadcast distribution list. The "broadcast" service provides guaranteed delivery options through: confirmation of send, retry if busy, and produce a report if the fax is unable to be delivered.

Online Chat/co-browsing 713 enables customers accessing a web site to interact over the same mechanism they use to access web pages. The system also employs skill-based routing for chat, enabling the customer to be routed to the most appropriate agent. Skill-based routing requires the gathering of information about a customer. Information gathering can occur with the chat origination point (on the website) by interacting with a chat robot or form. The robot or form functions in the chat world much like an IVR does in the voice call world. The chat robot can identify the customer or the reason for the chat request, and then provide this information to a chat workflow to perform skill-based matching and find the most appropriate agent. Online chat also allows the agent to transfer the "chat" to another agent. The customer can be provided with a full transcript of the session via email. Chat and co-browsing sessions are handled much like voice communications. The agent chat/co-browsing capabilities include: answer, forward, conference, transfer, and record. The agent-enabled agent can handle more than one chat session, concurrently.

Email 712 is a major communications channel for the sales/service world today and is growing fast. The system features that make email manageable within a call center are: routing and queuing of email by specific agent; queuing to groups of agents based upon skills; auto responders (software that automatically acknowledges emails being received); library of boiler-plate responses, accessible by agents; spelling checker accessible by agents; escalation based upon business rules (time in queue, time without closure, etc.); reporting of Agent productivity, queue statistics, and dispositions; and monitoring of emails sent by an agent (a blind copy to Supervisor or QA team). An additional feature are robot responders which are software that 'reads' an email and then creates a suitable response, either for directly sending back to the customer or for forwarding to a queue of agents for verification that the response is appropriate.

Email 712 is deferrable work thus can be optionally set to be 'owned' by an agent after logout. Owned email can be retrieved at the next logon in the same state as it was when the agent logged out. Un-owned email goes back to a general pool before the agent may log out. Inbound email is scanned by artificial intelligence to determine the required agent skill-sets and is then routed using powerful workflow techniques. The "matched" agent receives the email where it is viewable via the desktop. The email system supports incoming and outgoing attachments, both html and standard text and Rich Text Format (RTF) and international languages.

Web Callback 715 is supported by the system. The customer enters a telephone number (and optionally some other qualifying data) on a web form and presses a 'send' button. This request is then queued within the system until a suitable agent is available. The system then dials the customer and connects the requestor with the agent, treating the call from that point on like any other telephony channel connection. Additional features of web callback are: a graphical or numeric 'countdown' is displayed to the customer indicating their likely wait time and graphical IVR features are brought into play for the customer's web browser, optionally leading the agent through a preprogrammed scenario or pitch.

Paper correspondence 717 is supported by the system once it has been scanned and stored in the correspondence database. For example, a Company receives a letter from a client. The Company then scans the correspondence into the correspondence database. The Company also adds some qualifiers to the scanned material indicating the topics in the correspondence, or designating the department needing to handle the item. The scanned correspondence is then queued to the appropriate set of agents using workflow management. When an agent is available, the correspondence is delivered to the desktop. The agent takes the appropriate action and then signifies that the correspondence has been handled.

The voicemail 710 function has the functionality of workflow routing. "Standard" voicemail 710 features include, but are not limited to: create personal mailbox; create and change passwords; record; review number of new messages; playback, ability to review/monitor agent voicemail; save messages; review number of saved messages; fast forward; delete; time-of-day announcement; broadcast; create distribution lists; menu system; priority messaging; customized greetings; agent reporting; and supervisor reporting.

Voicemail 710 can be agent-specific, or general (i.e., not agent-specific.). The customer accesses agent-specific voicemail when they wish to leave a message for a specific agent (such as for an extension-directed call). In this case, the voicemail greeting can be optionally personalized for or by the agent. Agents can have several voicemails in queue corresponding to the roles they have within the company. When the agent for whom voicemail has been left becomes available, the voicemail is delivered to them much as a voice call is. Voicemails that are not targeted at a particular agent are left in queue for the first available "matched" agent. This is the first agent to become available who has the skills to handle the type of communication channel. Examples of this kind of voicemail is a caller leaving a message instead of electing to remain longer in queue; and a caller calling after hours. When an appropriate agent becomes available, the voicemail is delivered to them much as for a voice call. The agent has additional commands that they can employ for the disposition of the voicemail (keep, forward, delete, callback, etc.)

A caller dialing into the system has the ability to leave a voicemail requesting a callback or information, if they choose to do so. The voicemail 710 is then routed to the agent's desktop where it can be treated as deferrable or non-deferrable work. An example of deferrable work is when a caller dials a bank's toll free number to speak with a loan officer, the number is connected to an IVR that prompts the caller to enter their account number. While on-hold the caller listens to music. After a period of music and holding, the IVR asks the customer if they would like to continue waiting or leave a message, prompting the caller to respond with "1 for wait" or "2 to leave a message." The caller presses 2 on the telephone keypad and then leaves a message having elected not to wait any longer in the queue. The voicemail is then routed to a group or individual queue for working as time permits. An example of non-deferrable work is when a caller dials a bank's toll free number to speak with a loan officer, the number is connected to an IVR that prompts the caller to enter their account number. While on-hold the caller listens to music. After a period of music and holding, the IVR asks the customer "would you like to continue waiting, or leave a message for callback—you will not lose you place in line." The IVR further prompts the caller to respond with "1 for wait" or "2 to leave a message for callback." The caller presses 2 on the telephone keypad and then leaves a message. The voicemail keeps its place in queue and is routed to the agent desktop as non-deferrable callback work.

Internet Protocol (IP) Telephony and Video 716 supports customer voice and video communications via IP telephony using an industry-standard H.323 client implementation such as Microsoft NetMeetingT, VocalTec IPhoneT, Intel Video PhoneT, and other compliant protocols. Voice over IP requires a high bandwidth TCP/IP connection and appropriate multi-media hardware. Higher bandwidth TCP/IP connections, with appropriate client components, are required to support Video over IP.

Order Entry provides the mechanism for the acceptance and processing of new customer applications, and converts them into customer accounts. To accomplish this, the potential customer fills out a web-enabled application form, which collects pertinent customer and customer credit information. The system conducts numerous edits at the time of entry to ensure all information is valid. Once the entry of all required fields has been completed, the applicant "submits" the information for processing. The system again performs all edits in another effort to ensure that all required fields have been completed and that invalid information is flagged and returned for re-entry. If an error-free application meets certain credit requirements for credit approval, it can then be approved. Otherwise, various credit actions are available, such as credit card authorization and routing to a credit support agent.

After completion of the above steps, the application goes through Application Order Entry processing. The system then assigns the applicant a customer account number and adds the information to all pertinent databases. Following this process, the application becomes a customer account and is available to all other parts of the system such as provisioning and billing. The following is required to establish an account: define requestor/applicant; specify type of service components requested; specify number of agents requested; specify payment type; specify billing information and specify administrator. For example, the potential customer/applicant establishes an account through the account set-up process, facilitated via the account set-up GUI. The customer/applicant establishes an Internet browser session and goes to the system URL. The applicant accesses the account application through the GUI, and is presented with the account application screen. This GUI presents the customer with an easy to use, step-by-step application process. The customer/applicant is presented with a GUI that collects the required information. All data entry fields are "data checked" to ensure the correct values have been entered and the "required fields" have been completed. For example, the "name field" will not accept numerals, and the "postal code" field will only accept numerals. Data collection will be accomplished using a combination of free-form text and pre-populated "selectable" fields.

Administrator Desktop

Customer provisioning is accomplished via the Administrator Desktop. The configuration and agent set-up guides the customer through the provisioning process. The configuration and agent set-up process provides the mechanism by which the customer's named Administrator defines and configures their selected system components, media types, and agents to meet their specific business needs. Once the customer has received an Administrator password and user id, the configuration and set-up process can begin. The system provides the customer with an easy to use, step-by-step process, facilitated via the configuration and set-up GUI's. Help screens are available to assist the customer with terminology and "how to" information at anytime during the configuration and set-up process.

The configuration process allows the Administrator to specify the media events they will be using (i.e.; voice, fax, chat, email, postal mail) and establish and setup the agents. The agent set-up process allows the Administrator to define agent skill-sets, specify their locations and create agent user names and passwords. Once created, the Administrator will be able to view and/or download a list of agent user/id and passwords.

The Administrator provides the customer with the ability to specify the routing and control of each communication through the system, regardless of media type. Call routing is controlled by a user-entered, high-level programming language, or diagramming tool provided in the Administrator toolset.

The easy-to-use GUI allows the customer to define individual workflow needs and then test the workflow on-line. The Administrator provides version control and ability to revert back to an earlier program if necessary. Configuration control includes specifying media events and workflow. Specifying a "media event" is the process of defining how a specific media type will be configured to support events (communications), and how the communications are to be processed.

Media event lifecycles similar to TSA workflow or call treatments can be established for all types, from the simple to the most complex. An example of this is assigning a telephone call to an interactive voice response unit (IVR.) With this option, the caller hears a spoken prompt and then responds to it by pressing the appropriate buttons on the telephone keypad or speaking. This can be specified to prompt the caller to provide additional information to drill-down or further clarify the skills needed to handle the call, and assign it to the appropriate agent. With touch-tone recognition, the IVR answers a call, plays a preprogrammed message and determines call routing based on the "callers" touch-tone responses. For example, IVR prompts the caller to "press 1 for Sales", press 2 for Support and Service." Voice recognition enables basic call routing instructions to be delivered via "spoken" word. The IVR answers the call and plays a pre-programmed message designed to determine call routing based on the "callers" spoken responses. For example, the IVR prompts the caller with "speak one Sales or two Support and Service", the caller responds with "two." The IVR then routes the call to the appropriate agent.

The valid media types for specifying events are: toll free number (voice); toll free number (fax); online chat/co-browsing; email; web callback; paper correspondence; self help voicemail and IP telephony and video. Specifying media events for both fax and voice involves specifying the allocation of one or more toll free numbers. Implicit in this allocation can be a skill-set. An example of this "skill-set" allocation would be designating a specific toll free number for billing inquiries or high-value customers.

The Administrator may configure the agent telephone connection in the following ways.
1. After logging in the agent is always connected (i.e., ready.). An advantage of this is that calls are connected with no delay. A disadvantage is that there will be a charge for the connection whether there is a call active or not.
2. The agent is only connected during a customer communication, at the end of the call the agent goes on "standby." An advantage of this, it will minimize the agent call connect charges. A disadvantage is that the agent phone will ring with every new customer connection.
3. The agent is configured with a time-out at the end of each call, which if exceeded the connection will be dropped. The Administrator sets the value of this time-out. The advantage of this is that it minimizes the call connection set-up time and it should optimize call connection charges. The disadvantage is potentially paying for the connect time of the time-out. If the connection has timed-out, the agents phone will ring with the next/subsequent connection.

The system also checks for a call in queue before dropping the agent connection and to predict the likelihood of a call in queue before dropping the connection. If the connection is permanent then a new call arrival is announced via a zip or whisper tone. Agent's telephones do not need to audibly ring in order to announce call arrival. Customers wishing to have a silent contact center may choose to equip their agents with phones with silent indicators such as lamps or to announce call arrival purely via an indicator on the desktop.

Dynamic Trunk Agent Allocation

There is an implicit trunk-to-agent ratio assumed by the system based upon the number of agents specified by the Administrator during the configuration process. The Administrator may choose to modify this trunk-to-agent ratio for a number of reasons. They may wish to have additional calls in queue listening to hold messages prior to being connected to agents. They may wish to have no calls in queue, thereby minimizing the cost of agents on calls. Whatever the ratio is set to be, the system will detect when that ratio is to be exceeded and refuse to accept any additional calls.

When inbound Telephony Switching Apparatus is offered as a service to customers one of the challenges is to ensure that the volume of calls coming in on one customer's toll-free numbers do not overwhelm the telephony resources and thereby prevent equitable treatment for other customers. This invention presents a mechanism for handling this and allowing fair treatment for customers based upon agent count and their pre-determined trunk-agent allocation.

With dynamic trunk agent allocation, excessive volume of inbound calls do not result in inequitable use of telephony resources; trunk-agent ratios can be pre-allocated and dynamically changed based upon active agent counts; the number of calls answered can be increased (decreases abandoned calls); and the agent work time can be increased.

Setting up a call center for inbound agents requires a decision to be made on the number of inbound trunks that will be made available for callers. The industry standard is to use a figure of 1.1 for inbound calls and 2.0 for outbound predictively dialed calls. For a static center with an on-premise TSA, this decision is made and then the business works within it, since it determines the ordering and installation of actual equipment.

In a virtual TSA environment such as is experienced by customers using an TSA service, the trunking also has to be virtual. However this is can only occur as an efficient use of resources if it can vary along with the numbers of agents signed-on to the system.

This invention allows the number of trunks to vary to meet the business need of the agents in the virtual call center. There are two elements to the requirement. First is the need to have trunks available for after hours use, so that voicemail messages may be captured. Second is to have the trunks available in a standard 1.1 or similar trunk/agent ratio, for when agents are available to take calls.

Figure 8A:
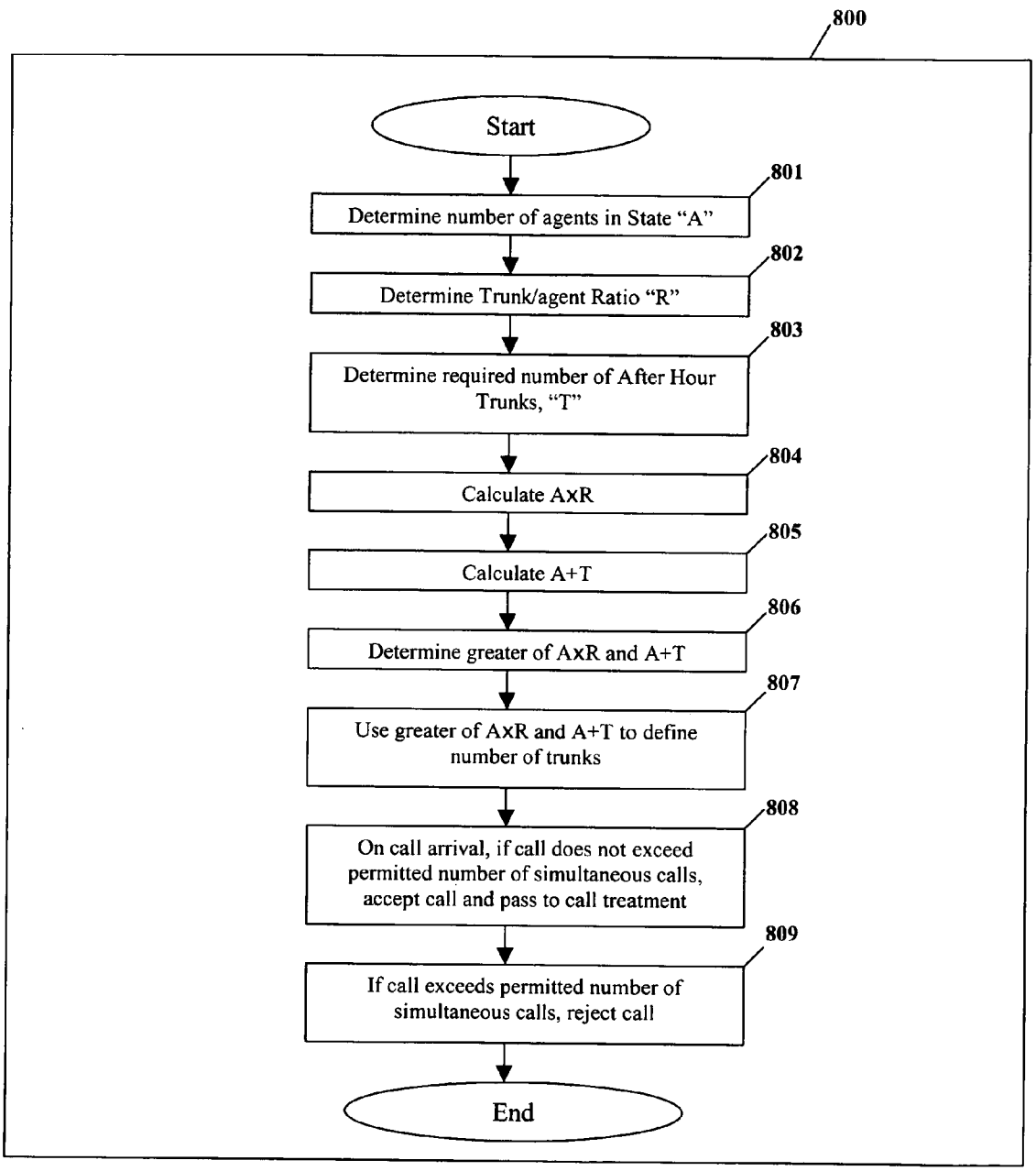
FIGS. 8A, 8B and 8C are flow diagrams of embodiments of dynamic trunk agent allocation.

FIG. 8A is a flow diagram of one embodiment of dynamic trunk agent allocation. The system looks at the number of agents in a state to contribute to the calculation (such as signed-in and not on break) 'A' 801, the trunk/agent ratio 'R' 802, and the number of after-hours trunks required 'T' 803, and calculates two numbers:
1. $A*R$ (804)
2. $A+T$ (805)

The greater of those two numbers 806 is then used by the system to determine the number of trunks that are to be made available for this customer 807.

When a call arrives in the system and is identified as belonging to a customer, the system performs the calculation above to determine if the call exceeds the permitted number of simultaneous calls or not. If it does not, then the call is accepted using the appropriate signaling and passed on for the pre-determined call treatment for a call of that nature 808. If it does exceed the number then the system will reject the call by using appropriate signaling, at which point the customer will hear a fast busy tone signifying congestion, or insufficient resources to connect the call 809.

Figure 8B:
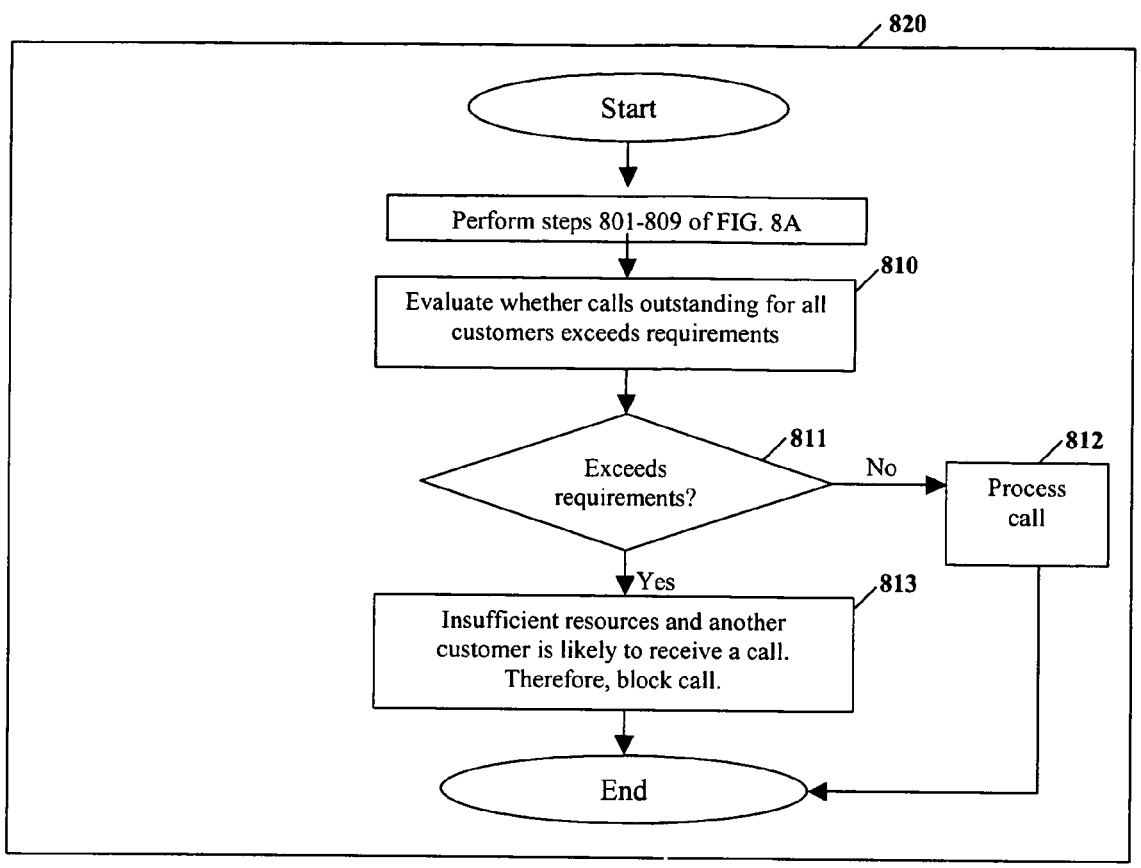

FIG. 8B is an alternate embodiment of dynamic trunk agent allocation. Steps toll free through 807 of FIG. 8A are first performed. Then an additional mode of determining if an incoming call is in excess to requirements or not is done by evaluating the calls already outstanding across the system 810. In this mode the system makes a determination of if there is sufficient overall resources to accept the call without diminishing the resources available to other customers 811–812. To make this accurate, some prediction can be added to the calculation. The prediction is to foresee if another customer is or is not likely to receive a call during the next expected call duration that would otherwise be blocked by this call 813.

Figure 8C:
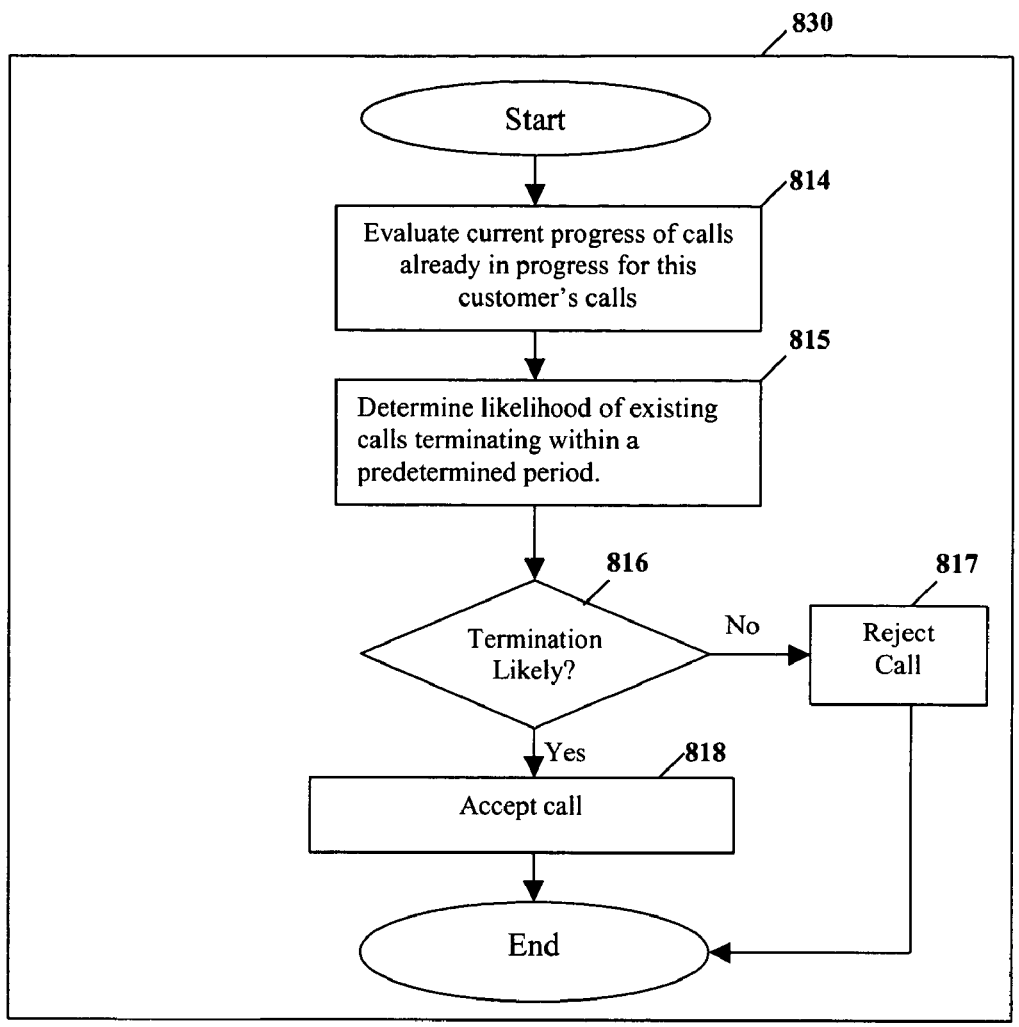

FIG. 8C is an alternate embodiment of dynamic trunk agent allocation. Steps toll free through 807 of FIG. 8A are first performed. Another embodiment of determining if an incoming call is in excess to requirements or not is done by evaluating the current call progress of calls already in progress for the customer that this call is arriving for 814. In this mode the system makes a determination of the likelihood of an existing call terminating within the next predetermined period 815. Such a calculation can then be used to decide if the offered call should be accepted or rejected 816–818.

Traditional customer premise TSAs must purchase telephone trunks to be used by callers to dial into the system and for use by agents in placing outbound calls. The TSA administrator must determine how many trunks are needed based upon the company's business rules. For example, if the company wishes for its callers to wait in queue for an available agent (and therefore incurring connection time costs), then a fairly large trunk-to-agent ratio would be employed. If the company wants its customers to get a busy signal, forcing them to call back, then a low ratio would be used.

Since the system is network based, a specific customer's trunks will be allocated from a large pool of common trunks. The allocation method must ensure that other customers are not starved for trunking facilities, plus have the option of not over allocating trunks to a specific customer. Since some customers will want to use only the minimum number of trunks necessary to serve their customers, a dynamic allocation method (ratio of trunks to agents) must be supported. Other customers will want a fixed (and therefore predictable) number of trunks allocated to them. Finally, some customers will want a combination of techniques, where allocation is dynamic up to a point but never goes to zero, but instead drops to a minimum fixed value. In addition, the allocation of inbound trunks must be independent of outbound trunks, ensuring that outbound trunks are always available even if all inbound trunks are in use.

The number of inbound trunks allocated to a customer is $f_i+r_i*(a_i+a_b)$, where
  $f_i$ is the fixed number of inbound trunks,
  $r_i$ is the ratio of inbound trunks to agents (e.g. 1.2 would result in 12 trunks for 10 agents),
  $a_i$ is the number of logged in, inbound-only agents, and
  $a_b$ is the number of logged in, blended (inbound and outbound) agents.

Thus, if the number of logged in agents goes to zero (i.e. the center is closed), then there would be no dynamically allocated trunks. However the fixed number of inbound trunks ($f_i$) would still be allocated, allowing inbound calls to be answered and messages taken, for example.

The number of outbound trunks allocated to a customer is $f_o+r_o*(a_o+a_b)$, where
  $f_o$ is the fixed number of outbound trunks,
  $r_o$ is the ratio of outbound trunks to agents (e.g. 2.0 would result in 20 trunks for 10 agents),
  $a_o$ is the number of logged in, outbound-only agents, and
  $a_b$ is the number of logged in, blended (inbound and outbound) agents.

Thus, if there are no outbound agents logged on (i.e. an outbound calling campaign is not active), there will still be a fixed number of outbound trunks ($f_o$) for routine outbound calls. The ratio $r_o$ applies only to predictive agents, that is, assisted dial agents only need a single outbound trunk, and so the number of inbound trunks is probably as applicable to them as it is to inbound-only agents. Furthermore, a blended agent is either handling outbound communication or inbound communications, but not both simultaneously. Therefore, a more efficient figure would be to have blended agents only get counted in terms of $r_o$, to avoid double counting. It is possible to assign blended agents either inbound or outbound trunks (but not both) and the one chosen would be the one with the greater trunk/agent ratio, which is the outbound figure $f_o$. This may be optimized in a number of ways: (a) since inbound agents have a less than 100% duty cycle (typically around 50%), their trunks can be reduced by this amount (unless calls in queue are seen as needed). (b) historically, predictive $r_o$ ratios for trunks were 2.0, but with the advent of caller-id and answering machines it is now above 3.0 and daytime predictive ratios are now as high as 5–10 $r_o$ ratio. After considering agent breaks, an 8-hour working day is actually about 7 hours and 10 minutes, which is a duty cycle of 89%. Add in dead time between calls or after call work time and you're at best 75% and probably nearer 50% actual duty cycle.

Figure 9:
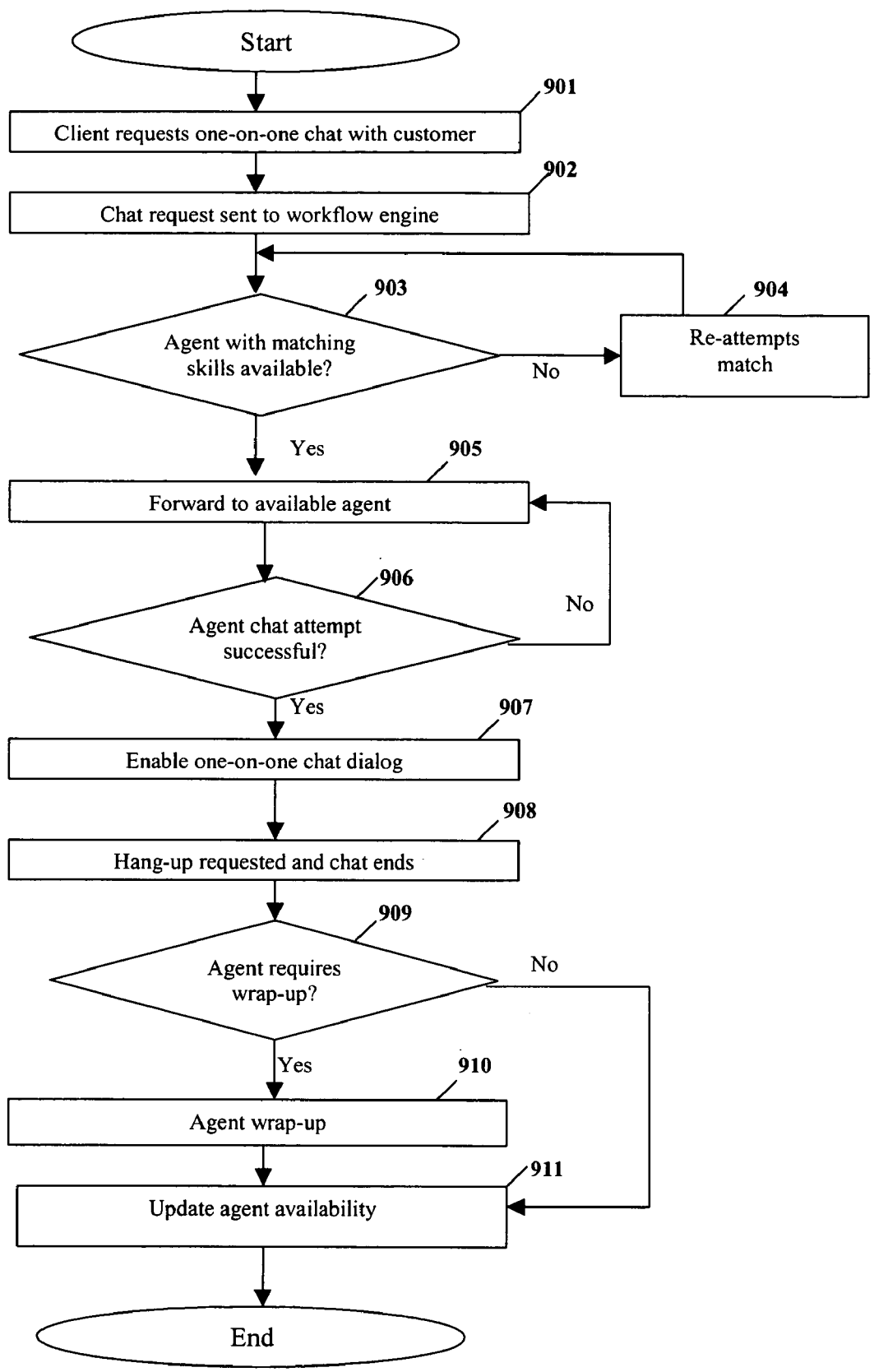
FIG. 9 is a flow diagram of the chat process.

Turning to FIG. 9, FIG. 9 is a flow diagram of the chat process. A client requests a one-on-one chat with a CCS user (customer) 901. A chat request is sent to the workflow engine 902. If a skills match is not found and a customer agent is not available 903, the match is reattempted 904 and processing continues at step 903. If a skills match is found and an agent is available, the chat is forwarded to the available agent 905. If the chat attempt is not successful 906, processing continues at step 905. If the chat attempt is successful 906, one-on-one chat dialog is enables 907. If a hang-up request is received the chat ends 908. If the agent requires wrap-up 909, the agent wraps-up the chat 911 and the agents' availability is updated 910 and processing ends. If the agent does not require wrap-up 909, the agent's availability is updated 910 and processing ends.

Figure 10:
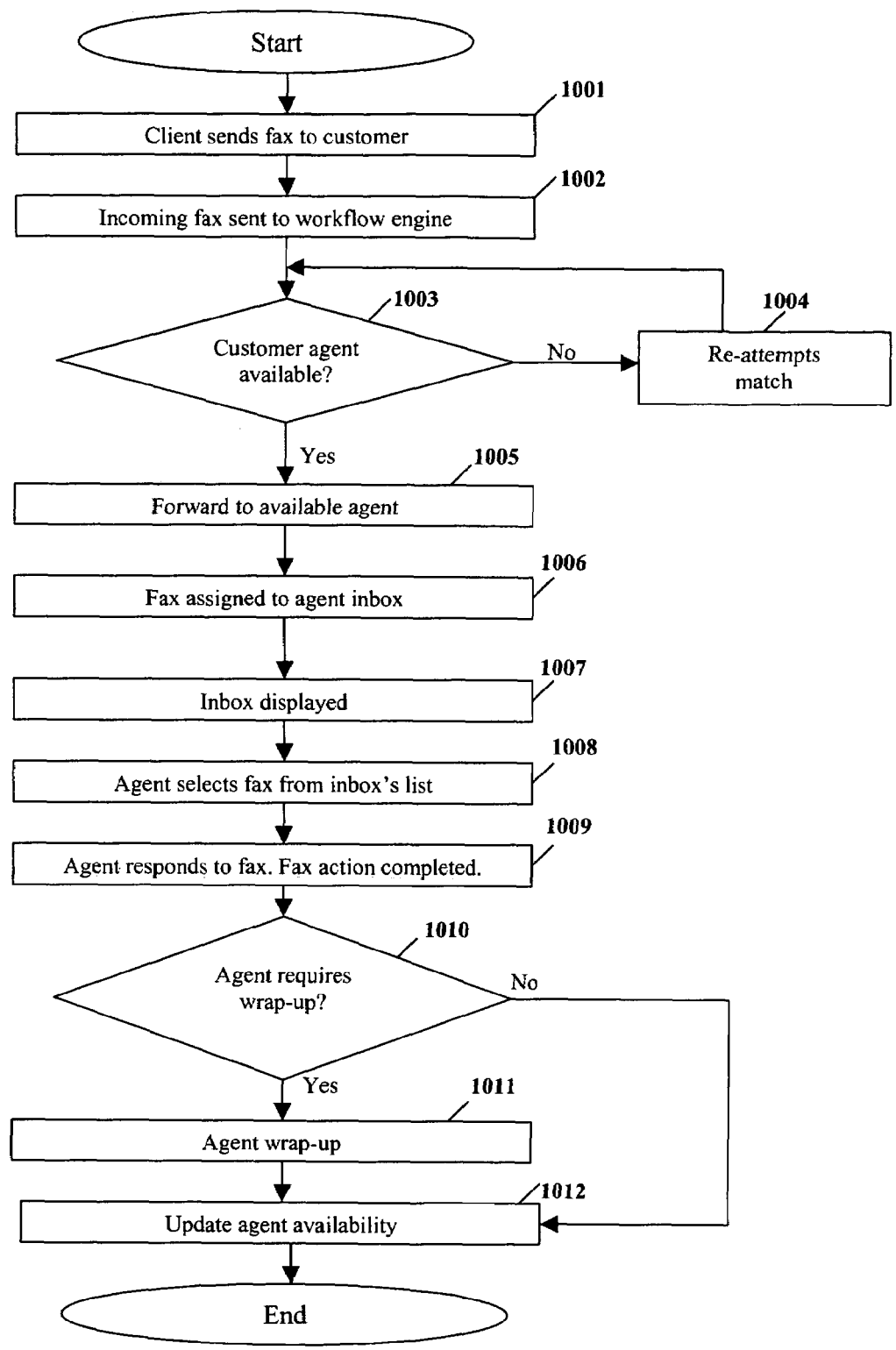
FIG. 10 is a flow diagram of the fax process.

Turning to FIG. 10, FIG. 10 is a flow diagram of the fax process. A client sends a fax to a CCS user (customer) 1001. An incoming fax is sent to the workflow engine 1002. If a skills match is not found and an agent is not available 1003, the match is reattempted or queued 1004. If a skills match is found and an agent is available 1003, the fax is forwarded to an available agent 1005. If the fax is assigned then the fax is added to the agent's inbox 1006. The inbox is displayed to the agent 1007 and the agent selects the fax from the inbox's list 1008. The agent responds to the fax 1009 and the fax action is completed 1009. If the agent does not require wrap-up 1010, the agent's availability is updated 1012 and processing ends. If the agent requires wrap-up 1010, the agent wraps-up 1011. The agent's availability is updated 1012 and processing ends.

Figure 11:
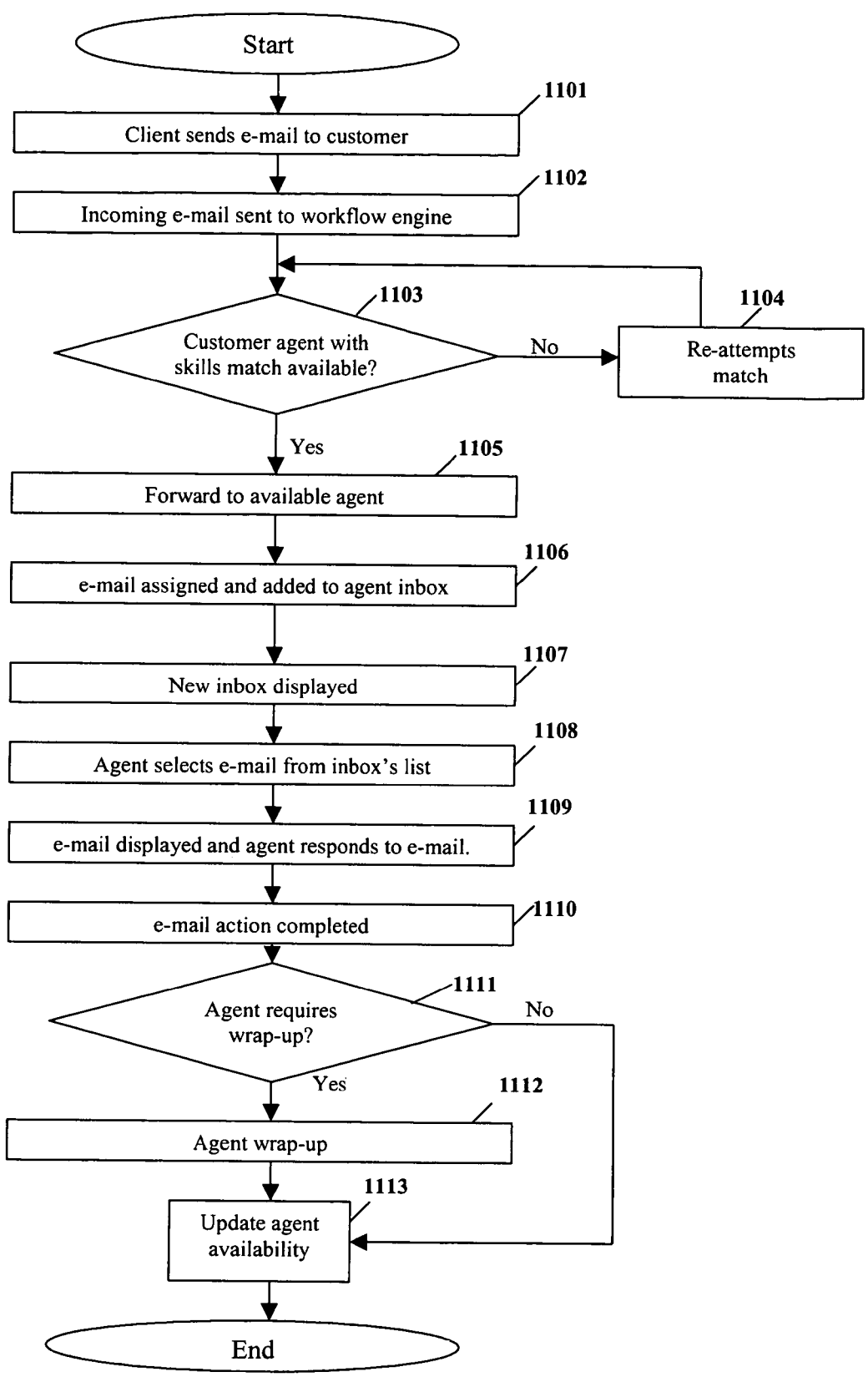
FIG. 11 is a flow diagram of the email process.

Turning to FIG. 11, FIG. 11 is a flow diagram of the email process. A client sends an email request to a CCS user (customer) 1101. The incoming email is sent to the workflow engine 1102. If a skills match is not found and a customer agent is not available, the match is reattempted or queued 1104. If a skills match is found and a customer agent is available, the email is forwarded to the agent 1105. The email is assigned and added to the agent's inbox 1106. The inbox is displayed to the agent 1107 and the agent selects the email from the inbox's list 1108. The agent responds to the email 1109 and the email action is completed 1110. If the agent does not require wrap-up 1111, the agent's availability is updated 1113 and processing ends. If the agent requires wrap-up 1111, the agent wraps-up 1112 and the agent's availability is updated 1113 and processing ends.

Figure 12:
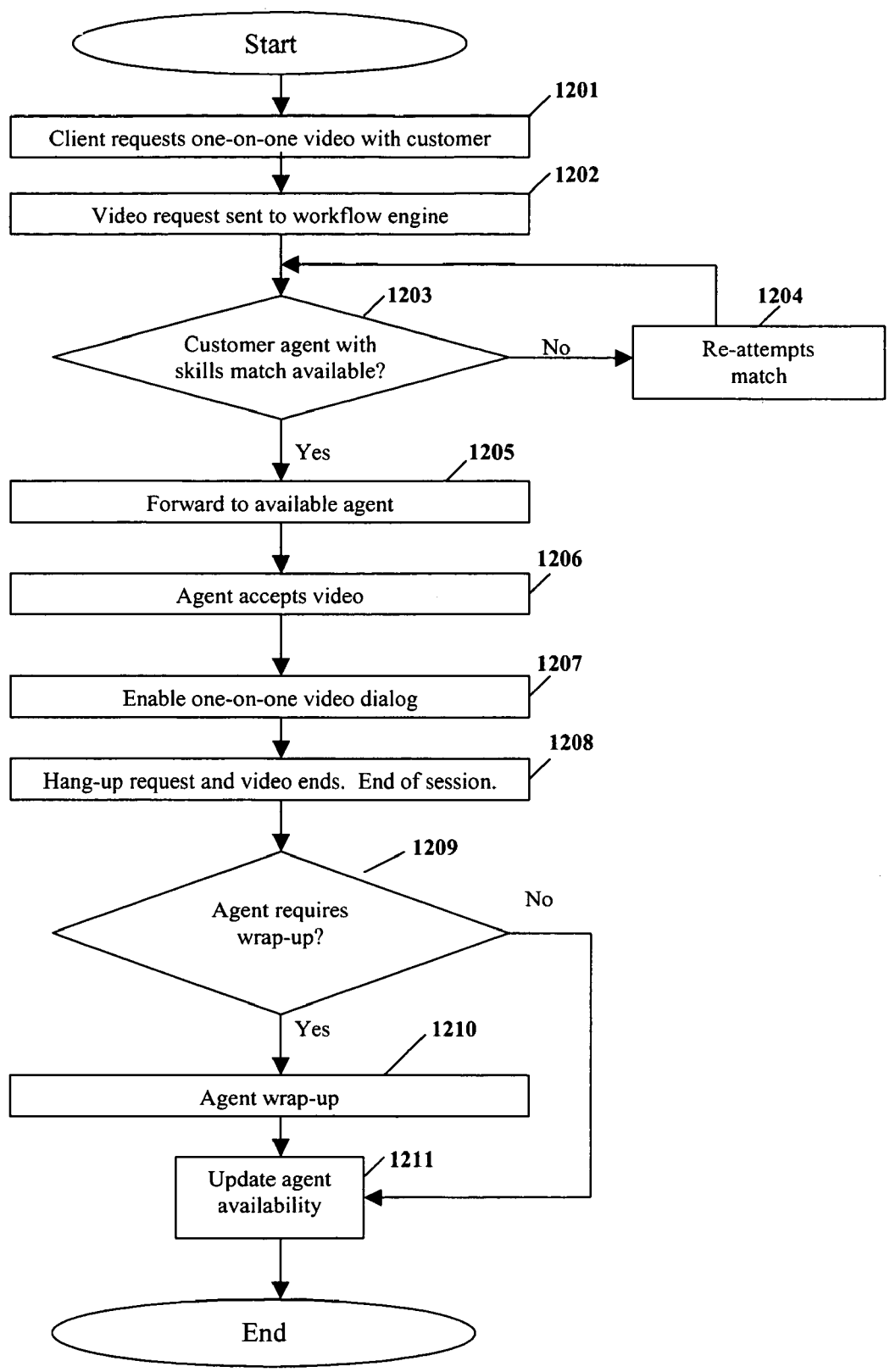
FIG. 12 is a flow diagram of the video process.

Turning to FIG. 12, FIG. 12 is a flow diagram of the video process. A client requests a one-on-one video with a CCS user (customer) 1201. A video request is sent to the workflow engine 1201. If a skills match is not found and a customer agent is not available 1203, the match is reattempted or queued 1204. If a skills match is found and a customer agent is available 1203, the video request is forwarded to an available agent 1205. The agent accepts the video request 1206 and a one-on-one video dialog is enabled 1207. If there is a hang up request received the video ends, signifying the end of the sessions 1208. If the agent requires wrap-up 1210, the agent wraps up 1210. The agent's availability is updated 1211 and processing ends.

Figure 13:
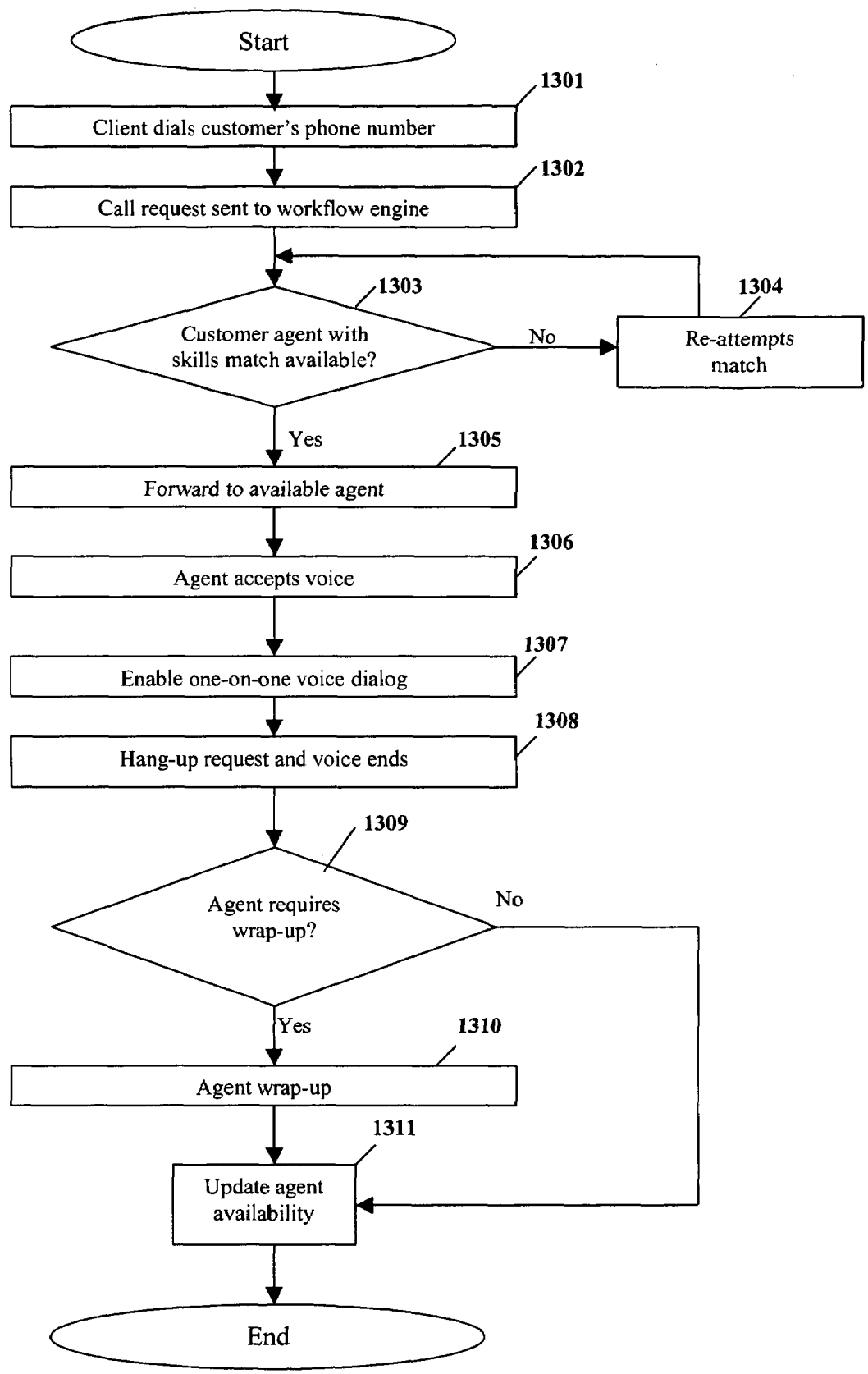
FIG. 13 is a flow diagram of the voice processing.

Turning to FIG. 13, FIG. 13 is a flow diagram of the voice processing. A client dials a CCS user (customer) 1301. A call request is sent to the workflow engine 1302. If a skills match is not found and an agent is not available 1303, the match is reattempted or queued 1304. If a skills match is found and an agent is available 1303, the voice is forwarded to the available agent 1305. The agent accepts the voice 1306 and one-on-one voice dialog is enabled 1307. If a hang-up request is received, voice processing ends 1308. If the agent does not require wrap-up 1309, the agent's availability is updated 1311 and processing ends. If the agent requires wrap up, the agent wraps-up 1310, the agent's availability is updated 1311 and processing ends.

Figure 14:
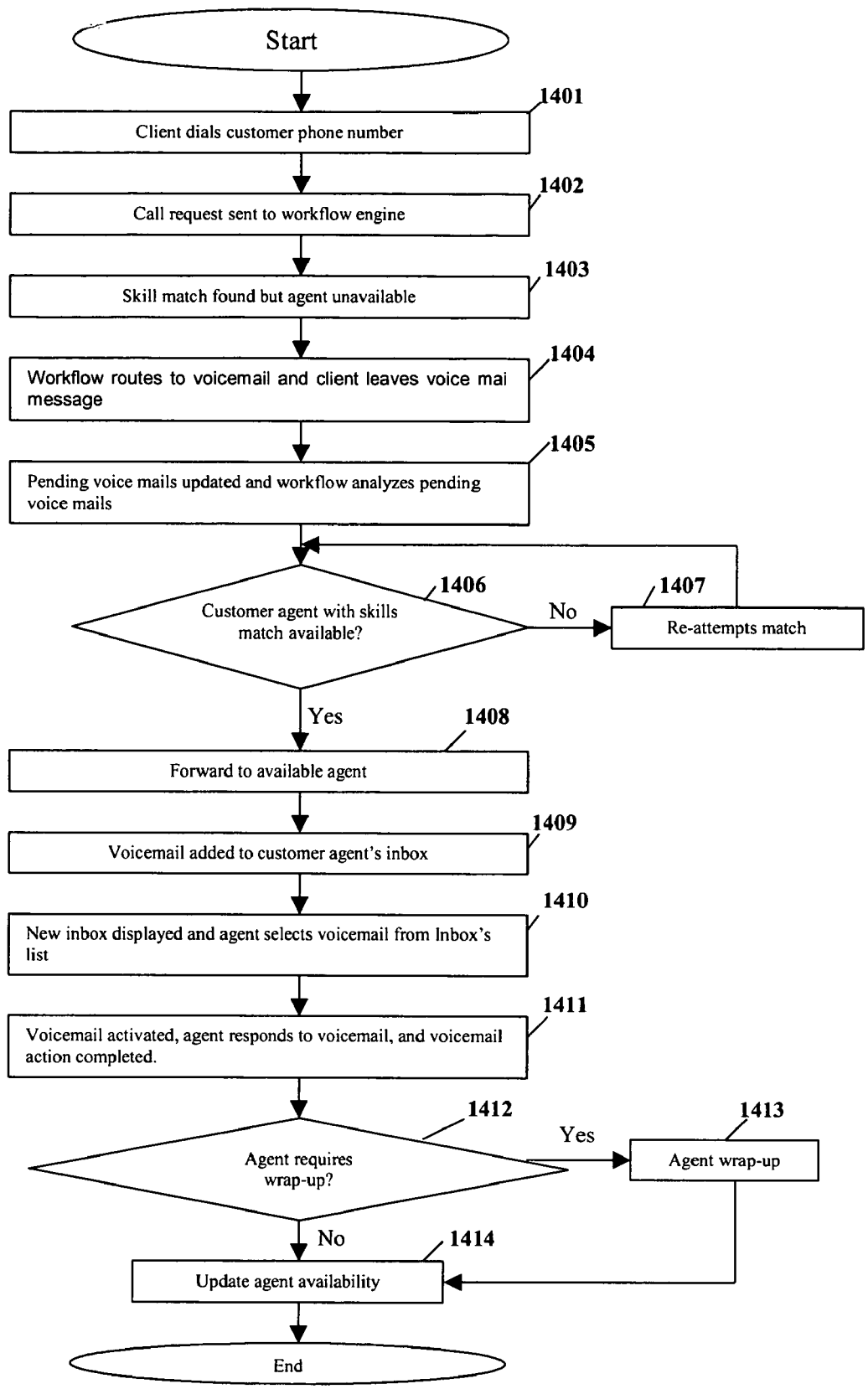
FIG. 14 is a flow diagram of the voicemail processing.

Turning to FIG. 14, FIG. 14 is a flow diagram of the voicemail processing. A client dials a CCS user's (customer) phone number 1401. A call request is sent to workflow engine 1402. A skills match is found but the agent is not available 1403. The workflow routes the call request to voicemail and the caller leaves voicemail 1404. The pending voicemails are updated and the workflow engine analyzes pending voicemails 1405. If a skills match is not found and an agent is not available 1406, the match is reattempted or queued 1407. If a skills match is found and an agent is available 1406, the voicemail is forwarded to the available agent 1408. The voicemail is added to agent's inbox 1409. A new inbox is displayed and the agent selects voicemail form inbox's list 1410. Voicemail is activated, the agent responds to the voicemail and the voicemail action is completed 1411. If the agent does not require wrap-up 1412, the agent's availability is updated 1413 and processing ends. If the agent requires wrap-up, the agent wraps up 1414 and the agent's availability is updated 1413 and processing ends.

Workflow

The Administrator can use readily available PC tools to establish complex media event lifecycles. A lifecycle is defined as the time a media event is presented to the system to when the customer communication has been completed by both the initiating customer and the receiving agent. For example, a lifecycle would include: the switch receiving the media event, matching the incoming media event with the agent with the right skills, sending the event to the agent's queue, and the agent processing and closing of the event.

Other actions during the lifecycle can include communication with an IVR, or a chat or email auto-responder, in any order. For example, after a call has been presented to an agent the call might be given to an IVR so that the person may hear their bank balance.

An example that crosses multiple media is as follows. A caller dials a bank's toll free number to speak with a loan officer and the number is connected to an IVR that prompts the caller to enter their account number. While on-hold the caller listens to music. After a period of music and holding, the IVR asks the customer if they would like to continue waiting or leave a message, prompting the caller to respond with "1 for wait" or "2 to leave a message." The caller presses 2 on the telephone keypad and then leaves a message having elected not to wait any longer in the queue. The lifecycle for such a media event could specify that if the voicemail message left by the caller could not be responded to by the end of day that the caller would receive an email saying that they will be called back tomorrow.

One of the most critical stages in the advanced routing process is in the match algorithms themselves. These algorithms are used to associate the incoming media event with an available agent. The match takes into account the skills and proficiencies required by the media event and those offered by the agent pool. Skills and proficiency levels for incoming media events are determined through a series of customer and customer purpose identification steps. Examples of these are: (a) sending email via specific web forms, (b) responding one equals billing inquiry to an IVR prompt, or (c) the chat address it was posted to. A match can result in three outcomes: the media event is matched to an appropriate agent; the media event could be delivered to more that one agent and a tie-breaker is required; or the media event was unmatched.

Figure 15:
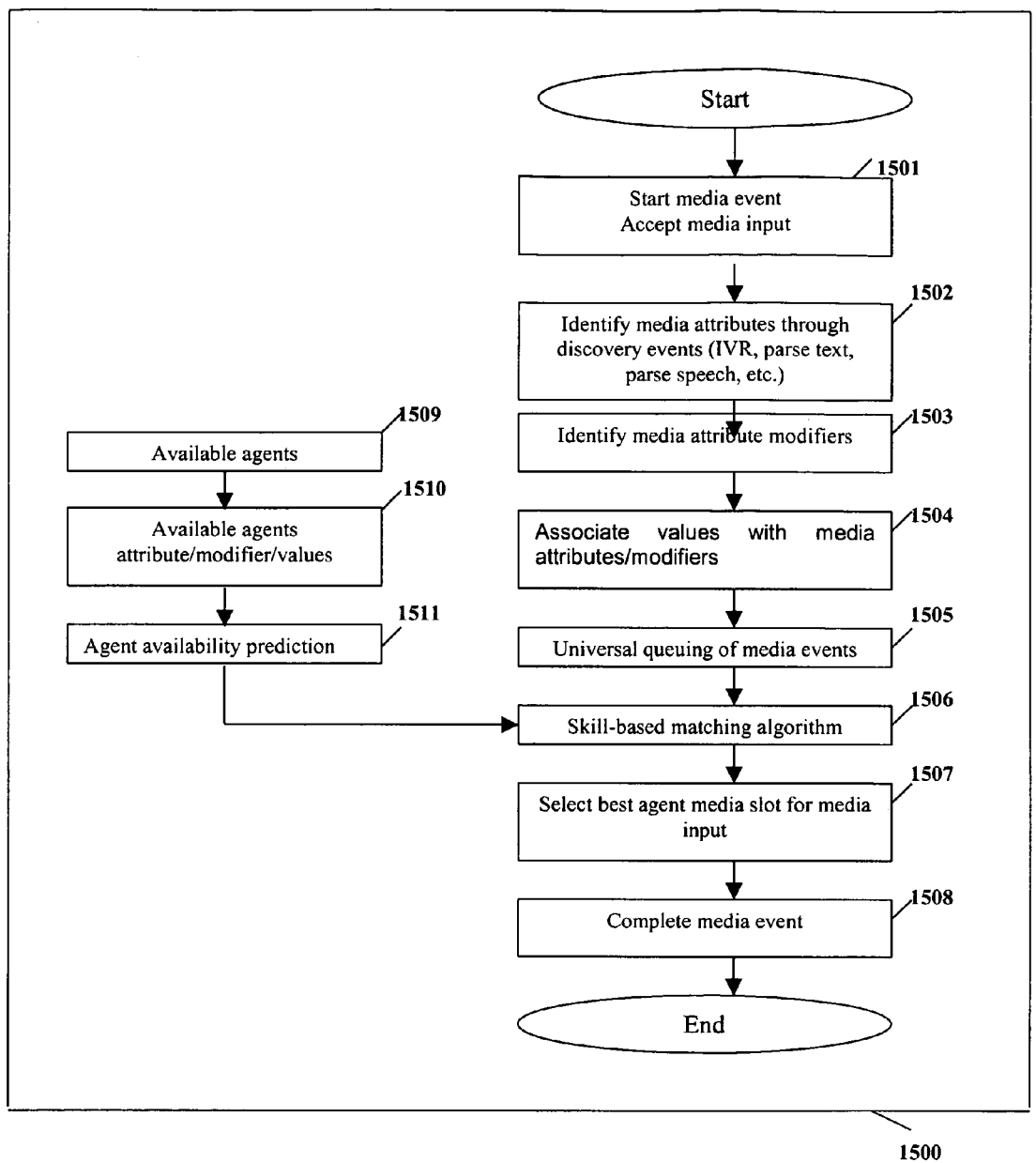
FIG. 15 is a flow diagram of multimedia workflow.

Turning to FIG. 15, the invention recognizes that media treatments are an instance of workflow, in other words the orderly progression along a series of prearranged steps to meet a business goal. The invention therefore includes a workflow engine, compliant with the requirements of the Workflow Management Coalition, to perform critical elements of media treatments, depicted as Multimedia Workflow 1500 in FIG. 15. Within the invention, the following are embodiments of workflow in the area of voice call handling: assignment of inbound call to an agent; routing through an IVR and then to an agent; providing a set of delayed announcements, interspersed with hold music, while waiting for an available agent; performing a blind transfer of a call to an agent or group of agents; and performing an assisted transfer of a call to an agent.

Additional similar embodiments are implemented in respect of additional communications media, such as email. One key element of the tasks governed by workflow is to match a media event 1501 with the most appropriate agent to handle that media event. To carry this out, the invention assigns attributes 1502 that can be thought of as 'skills' to the media event through a variety of means and then endeavors to locate a match of these skills among the community of available agents 1509. The attributes are assigned through discovery events 1502 that surface additional information about the media event.

For example, an email sent to sales@thisco.com is likely to require someone skilled in sales to be able to address the concerns within it. Thus the attribute 'SALES' can be assigned to the media event thus enabling downstream matching tasks to seek a suitable agent as one having the 'SALES' attribute or skill. And a voice call passing through an IVR stage that invites the caller to 'press 1 for sales and 2 for service' will emerge with either the sales or the service route being taken. Therefore, in this instance, the appropriate attribute can be assigned by the invention allowing downstream matching tasks to find a suitable agent to handle the call.

Discovery events 1502 can either be ones of origin, or ones of inquiry. We have seen an example of origin-based discovery events (sales@thisco.com) and an example of inquiry-based discovery events (IVR). Either way a complex set of attributes can be assigned to the media event. This set can be viewed as a set of attributes that are logically ANDed together and then ORed with another set of attributes that are themselves ANDed together, and so on without theoretical limit. This set is then matched against the linear set of attributes that have been assigned to the agents 1510 and the best agent is chosen. There are two complexities to this. First is that media attributes 1502 and agent attributes 1510 can be given modifiers 1503, 1510, and the second is that they can be given values 1504, 1510. Modifiers arise where the existence of the attribute is not in itself a sufficient requirement for a successful match, but instead a value associated with that attribute is required. An example is where the media event requires skills in Spanish and the nature of the inquiry is such that the skill needs to be of level 9 or above rather than the lower level of 8. Values are where the match has to be against the value that is assigned to the media event and the skill alone is insufficient information to make the match. An example is where the caller has been prompted to enter the extension of the agent they are attempting to contact, and while the skill might be 'EXTENSION', it is the value in the agent attribute profile that will enable the correct match to take place.

Universal queuing of media events 1505 permits an overall prioritization to be applied to a set of multi-media interactions, which can be inbound or outbound. Multimedia interactions are those that occur via a variety of media, such as telephony, the Internet, and other media. By employing an agent-based media-independent throttle to ensure that agents are given tasks within their capacity to perform them, the interaction handling system can meet the overall business requirement of handling interactions according to an externally determined set of priorities.

Universal queuing 1505 provides priority of the interactions. This is done by assigning priority or a priority weighting to each step in the interaction treatment up to the point that it is ready for delivery for an agent. For example arrival on an toll free number or to a given email address means the interaction gets assigned a certain priority. Then passing the call through an interactive voice response unit and capturing a certain caller entered digit, or passing the email through a parser and detecting a certain word sequence, can modify an already assigned priority.

Universal queuing 1505 evaluates the set of outstanding interactions (on hold) and assembles them in descending rank order of priority. The system then evaluates the ability of the agents to take additional interactions and delivers the set of interactions that meets a given objective function. Agent availability prediction 1511 provides for predicting when an appropriate agent may be available. The objective of the universal queuing 1505 might be to maximize the number of interactions in descending priority order, or it might be to ensure that the highest priority interactions are handled even at the expense of lower priority interactions.

Lastly, there is the definition of 'best' in determining which is the best agent to handle a media event. The skill-based matching algorithm 1506 handles this function. There are many factors that go into choosing an agent for a media event, in addition to requiring the appropriate attribute match, modifier requirement, or value match. For example, if two agents score equally, then additional factors are typically taken into account. These can be: length of time that the agent has been without a media event; seniority of the agent; bonus accelerator ranking; and so on. So the full function of which agent to choose is a complex one and is best described as an 'expectation function' with this being a function of the full set of variables, scaled, weighted, and factored according to the business goals.

If E is the expectation function result, then the function is written $$E = f(a, b, c \ldots)$$

Where a, b, c, and so on are all factors of variables that the business requires to be taken into account in choosing the most appropriate agent for the match. E is calculated for each agent in the available pool and the agent with the highest value of E is the one who receives the media event. Computationally this is linear in the number of agents and thus is appropriate for computer processing.

One anomaly that occurs with skill-based routing where attribute modifiers are employed is that matches can occur that are less than optimal. One example will illustrate this.

Consider two agents. The first agent A1 is at level 10 for a required skill. The second agent A2 is at level 8 for a required skill. Let us further assume that the weighting factors are such that A1 will be given work before A2, all else being equal. And consider two media events. The first event E1 requires level 7 for processing for a required skill, the second event E2 requires level 10 for processing. Further assume that E1 will be processed for a match before E2, all else being equal.

Now a simple match will take event E1 and give it to agent A1 and then be unable to give event E2 to agent A2 because agent A2 does not have a sufficient level of attribute modifier for a successful match. The invention looks across all events and all agents and determine the best set of events to be matched to selected agents so that the overall value of the expectation function 'E' is maximized. This is computationally related to the product of the counts of events and agents and thus is not appropriate for highly scalable computer processing. However there exists at least one algorithm, the 'Stable Marriage' algorithm, that is linear in the sum of the counts of events and agents and which can render the approach appropriate for highly scalable computer processing.

Within the invention, there is a high degree of media independence. In other words that the workflows for individual media types share many common elements (which therefore have to be configured only once), even though some aspects of the workflows are of necessity different. For example, all workflows that have as their goal the assignment of the media event to a suitable agent will contain a skill-based matching step 1506. This will therefore be common across media types. And a contemporary email workflow will contain a parsing step to isolate keywords that can be used as an inquiry-based discovery event. Contemporary voice workflows contain no such equivalent step. However future advances in technology, particularly in speech recognition, could allow parsing of the response to the question 'please state the purpose of your call' and thereby achieve the same end.

The invention embodies the concept of media slots 1507. These are logical receptacles for media events of a certain type. Thus an agent capable of taking two simultaneous voice calls would be configured to have two voice slots, where each slot can hold one voice call. This has several important advances over previous work that has required the agent to process only one piece of work at a time, such as a single call TSA. It also brings complexity in that the available versus unavailable state of an agent with multiple states is no longer a simple Boolean switch associated with that agent but rather is a function of definition coupled with the number of available media slots. Agents are then not only available for one media type and not another, but they may be more available (for example, greater proportion of free slots) for one media type than another.

The invention simplifies this by taking the key concept of agent availability and moving it to the slot level 1507. Thus there is a composite agent availability state that can be derived enabling traditional availability reporting to be done. Slots, on the other hand, are tracked, reported, and monitored in order to generate metrics of agent performance.

Routing

In specifying skills-based events, the delivery of a specific customer communication is based upon the events priority, the required skills of the agent and the necessary agent proficiency levels. The skill-based matching algorithm 1506 in the workflow engine then uses this information to locate the best available agent and assign the event 1504. The system uses an algorithm to ensure that the best possible match is always delivered.

With the purely skills-based set-up, media events requiring a certain agent skill to handle them will be delivered to available agents having that skill. If a skill-based routing match could not be achieved for the immediate event and currently available agents, the system could be defined to broaden the selection for that kind of media event. The Administrator can increase the chances for finding an available agent to handle it using advanced routing. If no skills are explicitly defined then all media events will be delivered to all agents. Skill-based matching for telephony switching apparatuss has been carried out successfully for several years now in the commercial marketplace. When only one interaction is delivered to an agent at a time then it can be a relatively simple task to ensure that the match made is one that meets some set of predetermined requirements. The classical example in the TSA world is to deliver the interaction (voice call) to the agent who has been longest idle. In the world of multi-media, involving several simultaneous interactions with a call-center agent, a new approach is required in order to maximize efficiencies and ensure success.

For classical TSA matching, it is best to begin with a recap of the single-media 'TSA' skill-based matching problem. Incoming interaction requests are matched to a set of skills by using a set of heuristics and lookup tables, which enable information gathered about the interaction to be used to attach a set of skills to that interaction. An example is a particular toll-free (toll free) number is identified as solely for the use by Spanish-speaking people, hence the skill required to address any such interaction is for the agent to be fluent in Spanish. The skill-based matching algorithm then inspects the pool of available agents and identifies the set with the Spanish skill attribute. Then, using the predetermined heuristic such as the agent who has been idle the longest, the system then delivers the interaction to the chosen agent.

Opportunities for enhancement occur with this approach if it is extended directly into the multi-media environment and in particular if the skills are also tagged with a number identifying the degree of capability in the skill. In the case of the interaction this would mean the minimum level of a particular skill or set of skills required to handle the interaction successfully. In the case of an agent this would mean the actual (tested) level of the skill that the agent has acquired.

With classical TSA matching, an anomaly can arise as explained below.

1. Consider a set of two interactions, where Interaction #1 requires a skill level of 6 and Interaction #2 requires a skill level of 10. Interaction #1 arrived in queue before Interaction #2 did and by standard processing heuristics should be delivered to an agent before Interaction #2 is delivered to an agent.
2. Now consider a set of two agents, where Agent #1 has a skill level of 10, and Agent #2 has a skill level of 8. Agent #1 has been waiting longest for work and therefore, according to the standard heuristic, should be given an interaction in advance of Agent #2.
3. The standard TSA skill-matching algorithm will take Interaction #1 and note that Agent #1 can handle it and therefore make that connection. Then it will take Interaction #2 and note that it cannot be handled by Agent #2 and therefore leave Interaction #2 on hold awaiting a suitable agent.

A better algorithm is to look across the set of interactions awaiting agents, across the set of available agents, and maximize the connections across both sets. So for the example above, a better approach would be to note that Interaction #2 could be matched with Agent #1 and Interaction #1 with Agent #2. Then two interactions can be handled and two agents can be made busy, thereby increasing agent work time and reducing interaction hold time.

This anomaly applies in all circumstances where weightings are given to skill levels, and it also applies to circumstances where skills themselves are given weightings such as in terms of relative importance, and the agent pools consist of agents with the required skills.

Although the example was only of two interactions and two agents, in reality larger groups of interactions and agents may be considered together. Then the objective can be defined in terms of a new heuristic such as maximizing the number of contacts created, or ensuring that the contacts involving the highest priority interactions are made in advance of other contacts.

Predictive Agent Availability

In addition to working with pools of available agents 1150, this approach also applies to a more sophisticated next step, which takes into account the likelihood of an agent becoming available with the required skills to take a call 1510. This is called predictive availability 1511 and further increases agent work time, reduces interaction hold time, and increases contacts.

Predictive availability 1511 requires the keeping of statistics about past contacts and their duration in order to predict when an agent with a particular set of skills will become free to handle an interaction. By 'looking ahead' interactions can be optimized. In the prior example, the system could note that Agent #2, even though still engaged in an interaction, is in fact likely to become free shortly, and therefore it is worthwhile making the connection between Interaction #2 and Agent #1 even though Interaction #1 had been waiting longer. Too far a departure from the expected norm of 'calls being answered in the order in which they were received' could have an adverse affect on the calling parties and must be taken into account within the algorithm.

Matching is the process by which an event is paired-up with an appropriate agent. Matching can be accomplished in two ways, via automated control, or manual control.

In an automated control configuration, the system uses a series of algorithms (defined at set-up) to determine the best possible match. These algorithms are collectively referred to as skill-based matching algorithms 1506. Automated control includes the use of tiebreakers, percentage allocation, and quotas to determine the best match.

Tiebreakers provide the system with additional criteria to determine which agent will receive a media event should a tie between two or more agents occur. For example, when a media event is specified to be handled by a Spanish-speaking agent, the system does a quick match and finds that there are three Spanish-speaking agents available. The system then checks for "tiebreakers" in the routing definition. A tiebreaker exists which specifies that the "longest inactive" agent receives the call. The call/media event is then routed appropriately.

There can be more than one tiebreaker specified in advanced routing. Tiebreakers are executed in serial order until a match is found or until there are no more found in the specified list. If the list is exhausted and no match has been found, an arbitrary match will be made.

Tiebreakers are only executed against the tied agent list, not against all free agents. They can involve an entirely customized match algorithm different from that used for matching skills and proficiencies. The system provides the tools to allow the customer to create their own tiebreakers.

Examples of tiebreakers include but are not limited to the longest inactive agent (this is the agent who has been longest without a call); seniority (this is the agent who is given an arbitrary privilege—in an TSA environment this could be sitting in the first chair in the bay or the agent who had the most sales, for example); and optional skills. There is no gray area about the skills and proficiencies used for the primary match, either an agents has the skills or the agent does not. Optional skills provide a mechanism to add additional criteria in the agent selection process. For example, it might be mandatory that someone fluent in English handles the media event but because the media event originates from Canada it would be nice to have it answered by someone familiar with Canadian phraseology.

For example, if agent Mike is supposed to handle 80% billing calls and 20% tech support calls whereas agent Jen is supposed to take 20% billing calls and 80 percent tech support calls. To decide whether to give a billing call to Mike or to Jen, percentage allocation would be used.

An agent can be established/configured to have a quota for a particular type of call. When the agent has exceeded the quota they will not receive any other calls of the specified class of media event. This can be implemented by dynamically removing the agent skills attributes associated with the quota when the quota has been achieved.

In a manual control configuration, the agent and/or supervisor has a view into the queue and can dynamically assign work. The Administrator may configure supervisors and agents to have manual control over media event assignment to agents. In a typical contact center, this would not be the norm but would be required in special circumstances.

The mechanisms that can be configured are:

Allowing the agent or supervisor, or both, to be able to view the queue of incoming media events.

Allowing a supervisor to see the queue that matches their agents skill-sets or all queues Allowing an agent to see the queue that matches their skills or all skills Allowing supervisors to dynamically assign work to agents if the skills match or to override that condition if they do not match Allowing an agent to be able to pick media events from the queue Universal Queuing Universal queuing of media events 1505 permits an overall prioritization to be applied to a set of multi-media interactions, which can be inbound or outbound. Multi-media interactions are those which occur via a variety of media, such as telephony, the Internet, and other media. By employing an agent-based media-independent throttle to ensure that agents are given tasks within their capacity to perform them, the interaction handling system can meet the overall business requirement of handling interactions according to an externally determined set of priorities. Universal queuing prioritizes interactions across media so that business requirements are met, ensures that agents work on the most important work and reduces wait time for highest priority interactions This is the mechanism that creates universal queuing or the ability to prioritize across media types according to an external set of priorities. Agents can handle one or more media types and this is configured in advance. There are several possible ways in which the agent configuration can be expressed. For example, the media types can be weighted and the configuration expressed as an overall total, or the media types can be simply counted and the agent set to be able to handle a maximum number of simultaneous interactions. The essence of the configuration is to express a combination of media types and interactions, which are the limit of the agent's capabilities.

In addition the priority of the interactions is set up. This is done by assigning priority or a priority weighting to each step in the interaction treatment up to the point that it is ready for delivery for an agent. For example arrival on an toll free number or to a given email address means the interaction gets assigned a certain priority. Then passing the call through an interactive voice response unit and capturing a certain caller entered digit, or passing the email through a parser and detecting a certain word sequence, can modify an already assigned priority.

The system evaluates the set of outstanding interactions (on hold) and assembles them in descending rank order of priority. The system then evaluates the ability of the agents to take additional interactions and delivers the set of interactions that meets a given objective function. For example the objective might be to maximize the number of interactions in descending priority order, or it might be to ensure that the highest priority interactions are handled even at the expense of lower priority interactions.

Agent Desktop

The Agent application is the key customer communication view and control mechanism. This interactive web-enable application provides the customer with a powerful toolset that permits the agent to control and service concurrent multi-media customer communications, through one desktop. The Agent application's workflow management permits the agent to resolve deferrable work as time permits, as well as view their personal progress through agent reporting.

An agent can be configured to have tasks delivered to them automatically, whereby the system matches the event and passes it to the skills-matched agent, or manually so that the agent has taken action to accept the task. Similarly, after completing an item of work, the agent can be set-up to be automatically available for the next item of work or they can request it manually.

While working an item of work, the agent may choose to work additional items of work if they have been set up to do so. When an agent is working a customer communication they could easily require the entire desktop for the communication session and any applications they need to have access to. Therefore an agent working multiple customer communication sessions will need multiple desktops. Desktops are made available to the agent via the desktop communication toolbar application.

A key concept to understand about agents working multiple multi-media communications is placing communications channels on-hold. For voice communication, this is the well known example for the TSA or PBX world where any customer not directly connected to the agents' headset will be on-hold listening to music or a suitable message, configured by the administrator. For chat and other media there is no parallel concept of hold. In the instance of chat, if the agent is not responding to that chat session the customer simply experiences a longer delay until the agent responds.

With the system's multi-media customer communication service there is no practical limit to the number of voice calls that an agent can have on-hold. And the desktop controller application allows easy visibility to each caller's status and it allows an easy mechanism to place the current caller on-hold and start to talk to a different customer.

The desktop communication toolbar application allows the agent to switch instantly between customer communication sessions, therefore between virtual desktops. Several facilities are available to the agent while they are working multi-media communications. These are swap between communications, communication alerts, service communications alert, and service all communications channels of the same media.

Firewall-Independent Screen Pop

This is a method of enabling screen pop to occur from a computer system external to the firewall-protected network on which a database is situated. A screen pop is the delivery, to an agent, of associated data simultaneously with the call, email or other media interaction. When the interaction delivery mechanism is a service external to the network that agent is on, firewall-independence is a prerequisite for success. Data delivered from a service external to the network on which the database or the agent is situated, simultaneously with the media interaction arrival, and independent of the firewall protecting the networks.

There is a system that manages the media interactions delivered to the agents. These agents access the system through their web browsers, thereby having access to the system across the firewall protecting the agents' network. The system delivers the interactions as a service and therefore is entirely outside any firewall used by agents or the databases used to store information about the originators of the interactions. This system determines identifying knowledge about the interactions. This can occur through a variety of mechanisms, for example capturing the originating telephone number of a caller, or the address an email is sent from.

The system then emits a web inquiry using the http or other firewall-friendly protocol to a web server situated inside the firewall where the interaction originator information is stored. A small program resident on the web server, working via the CGI, ISAPI, NSAPI, java servlets, or similar downstream mechanism then accesses the database and returns the appropriate data as an html stream to the system. The system then takes the html stream and delivers it to the web browser associated with the agent chosen to receive the interaction.

Supervisor Desktop

The Supervisor provides the customer with a complete supervisory suite; delivering complete view and control of agent activities and workload. The Supervisor delivers real-time graphical monitoring and detailed tracking with the ability to display: the entire enterprise, the supervisors' agent group, or individual agent's within the supervisor's group. Coaching and monitoring is available to the supervisor via phone and/or live chat sessions. The Supervisor includes the functionality of sign-on; view and change agent profiles; agent provisioning; message of the day; broadcast message; agent specific message; on-to-one chat; coaching; blind monitoring; voice mail; and reporting.

Using the foregoing, the invention may be implemented using standard programming or engineering techniques including computer programming software, firmware, hardware or any combination or subset thereof. Any such resulting program, having a computer readable program code means, may be embodied or provided within one or more computer readable or usable media, thereby making a computer program product, i.e. an article of manufacture, according to the invention. The computer readable media may be, for instance a fixed (hard) drive, disk, diskette, optical disk, magnetic tape, semiconductor memory such as read-only memory (ROM), or any transmitting/receiving medium such as the Internet or other communication network or link. The article of manufacture containing the computer programming code may be made and/or used by executing the code directly from one medium, by copying the code from one medium to another medium, or by transmitting the code over a network.

An apparatus for making, using or selling the invention may be one or more processing systems including, but not limited to, a central processing unit (CPU), memory, storage devices, communication links, communication devices, server, I/O devices, or any sub-components or individual parts of one or more processing systems, including software, firmware, hardware or any combination or subset thereof, which embody the invention as set forth in the claims. User input may be received from the keyboard, mouse, pen, voice, touch screen, or any other means by which a human can input data to a computer, including through other programs such as application programs.

Although the present invention has been described in detail with reference to certain preferred embodiments, it should be apparent that modifications and adaptations to those embodiments may occur to persons skilled in the art without departing from the spirit and scope of the present invention as set forth in the following claims.

What is claimed is:

1. A customer communication service system, comprising:

a call processing network having an interface connected to a telephone network and having a workflow manager connected to a global data communications network, said workflow manager receiving a customer media event, identifying attributes, and associating values therewith;

said call processing network further providing:

a) a shared disk cluster for storing data connected to cluster servers, said cluster servers connected to a call processing network LAN;

b) telephony and real-time services server computers connected to said call processing network LAN for providing voice processing service control, maintaining application state, load sharing, redundancy and fault recovery;

c) said interface comprising a Telephony Switching Apparatus switch and telephony resource nodes, said Telephony Switching Apparatus switch connected to a voice communications network, telephony resource nodes, and said call processing network LAN, with said telephony resource nodes connected to said voice communications network, the Telephony Switching Apparatus switch, and the call processing network LAN;

d) a firewall connected between the global data communication network and workflow management computer servers; and e) said workflow management computer servers connected to said firewall and said call processing network LAN, said workflow management computers managing workflow, receiving and distributing media events, and servicing client requests from the global data communications network;

a database associated with said workflow manager, said database containing available agent attributes for associating attributes of said media event with said agent attributes for the purpose of associating an available agent with a customer media event;

means for connecting geographically distributed agent communications from multiple call center sites to said call processing network; and means for connecting web client communications to said call processing network by voice and at least one other means selected from the group consisting of e-mail message transmission means, chat message transmission means, facsimile transmission means, digital video transmission means and digital voice transmission means.

2. The customer communication service system as described in claim 1, wherein said Telephony Switching Apparatus switch is connected to said voice communications network by a plurality of sharable voice trunk lines.

3. The customer communication service system as described in claim 1, wherein said telephony resource nodes are connected to said voice communications network by a plurality of sharable voice trunk lines.

4. The customer communication service system as described in claim 1, wherein said Telephony Switching Apparatus switch is connected to said telephony resource nodes by a plurality of sharable voice trunk lines.

5. The customer communication service system as described in claim 1, wherein each of said telephony resource nodes is connected by a voice recognition unit link.

6. The customer communication service system as described in claim 1, wherein said telephony resource nodes are adapted to provide at least one function selected from the group consisting of playing recorded audio announcements to callers, collecting dual tone multi-frequency digit strings from callers, providing a voice over the Internet protocol connection to agents using a high bandwidth Internet connection, playing music to calls queued by an Telephony Switching Apparatus switch, collecting information from callers via speech recognition, providing callers with voice mail, or facsimile receipt and delivery.

7. The customer communication service system as described in claim 1, wherein said telephony and real-time services server computers provide at least one function selected from the group consisting of real-time voice processing, maintaining application state, redundancy, load sharing, or fault recovery.

8. The customer communication service system as described in claim 1, wherein said workflow management computer servers are adapted to provide at least one function selected from the group consisting of provisioning system services, billing, accounting, web services, maintaining databases, or transferring client data to agents via the global data communications network.

* * * * *